US009928753B2

(12) United States Patent
Dozier et al.

(10) Patent No.: US 9,928,753 B2
(45) Date of Patent: Mar. 27, 2018

(54) DYNAMIC CHARACTERIZATION OF NODES IN A SEMANTIC NETWORK FOR DESIRED FUNCTIONS SUCH AS SEARCH, DISCOVERY, MATCHING, CONTENT DELIVERY, AND SYNCHRONIZATION OF ACTIVITY AND INFORMATION

(75) Inventors: Linda T. Dozier, Great Falls, VA (US); Edmund J. Fish, Great Falls, VA (US); Miles R. Gilburne, Washington, DC (US); Nina Zolt, Washington, DC (US)

(73) Assignee: Cricket Media, Inc., McLean, VA (US)

( * ) Notice: Subject to any disclaimer, the term of this patent is extended or adjusted under 35 U.S.C. 154(b) by 0 days.

(21) Appl. No.: 13/251,263

(22) Filed: Oct. 2, 2011

(65) Prior Publication Data

US 2012/0023263 A1    Jan. 26, 2012

Related U.S. Application Data

(63) Continuation of application No. 11/937,495, filed on Nov. 8, 2007.

(Continued)

(51) Int. Cl.
*G06F 15/16* (2006.01)
*G09B 7/08* (2006.01)
*G09B 19/22* (2006.01)

(52) U.S. Cl.
CPC .............. *G09B 7/08* (2013.01); *G09B 19/22* (2013.01)

(58) Field of Classification Search
CPC ........ G06Q 30/02; G06Q 50/01; G06Q 20/04; G06Q 20/29; G09B 5/00; G09B 7/00;
(Continued)

(56) References Cited

U.S. PATENT DOCUMENTS 5,710,884 A    1/1998 Dedrick
4,740,912 A    4/1998 Whitaker
(Continued)

FOREIGN PATENT DOCUMENTS

EP    1338966 A2    8/2003
FR    2814844 A1    10/2000
(Continued)

OTHER PUBLICATIONS

Ashley Lowery, Internet Neighborhood ePALS links world with Edwardsburg, South Bend Tribune, Mar. 14, 2001.
(Continued)

*Primary Examiner* — Jonathan Bui
(74) *Attorney, Agent, or Firm* — Nelson Mullins Riley & Scarborough LLP

(57) ABSTRACT

A system of computers on a wide area network that establishes connections between nodes on the basis of their multidimensional similarity at a particular point in time in a certain setting, such as a social learning network, and that sends relevant information to the nodes is provided. Dimensions in the definition of similarity include a plurality of attributes in time and community space. Examples of such dimensions and attributes may include a position in a learning community's project cycle, titles of readings and projects, the genre or subject matter under consideration, age, grade, or skill level of the participants, and language. Each of the network's nodes is represented as a vector of attributes and is searched efficiently and adaptively through a variety of multidimensional data structures and mechanisms. The system includes synchronization that can transform a participant's time attributes on the network and coordinate the activities and information for each participant.

16 Claims, 23 Drawing Sheets

Related U.S. Application Data

(60) Provisional application No. 60/857,560, filed on Nov. 8, 2006, provisional application No. 60/857,570, filed on Nov. 8, 2006, provisional application No. 60/857,583, filed on Nov. 8, 2006.

(58) Field of Classification Search
CPC .... G09B 5/02; G09B 5/07; G09B 1/00; H04L 29/06; H04L 69/329; G06F 17/30867; A63F 13/00
USPC ........ 725/87, 53, 42, 24, 112; 709/228, 224, 709/223, 217, 207, 203, 202, 225; 705/80, 7.33, 7.29, 64, 5, 36 R, 323, 319, 705/26.1; 707/999.01; 134/322
See application file for complete search history.

(56) References Cited

U.S. PATENT DOCUMENTS

| | | |
|---|---|---|
| 5,740,549 A | 4/1998 | Reilly et al. |
| 5,761,662 A | 6/1998 | Dasan |
| 5,768,528 A | 6/1998 | Stumm |
| 5,772,446 A | 6/1998 | Rosen |
| 5,813,863 A | 9/1998 | Sloane et al. |
| 5,863,208 A | 1/1999 | Ho et al. |
| 5,907,831 A | 5/1999 | Lotvin et al. |
| 5,933,498 A | 8/1999 | Schneck et al. |
| 5,970,231 A | 10/1999 | Crandall |
| 5,972,875 A | 10/1999 | Crutcher et al. |
| 5,974,446 A | 10/1999 | Sonnenreich et al. |
| 5,987,606 A | 11/1999 | Cirasole et al. |
| 6,020,884 A | 2/2000 | MacNaughton et al. |
| 6,029,195 A | 2/2000 | Herz |
| 6,075,968 A | 6/2000 | Morris et al. |
| 6,085,229 A | 7/2000 | Newman et al. |
| 6,105,027 A | 8/2000 | Schneider et al. |
| 6,105,055 A | 8/2000 | Pizano et al. |
| 6,157,924 A | 12/2000 | Austin |
| 6,208,995 B1 | 3/2001 | Himmel et al. |
| 6,233,618 B1 | 5/2001 | Shannon |
| 6,178,407 B1 | 6/2001 | Lotvin et al. |
| 6,249,282 B1 | 6/2001 | Sutcliffe et al. |
| 6,279,013 B1 | 8/2001 | LaMarca et al. |
| 6,296,487 B1 | 10/2001 | Lotecka |
| 6,302,698 B1 | 10/2001 | Ziv-El |
| 6,324,538 B1 | 11/2001 | Wesinger, Jr. et al. |
| 6,341,960 B1 | 1/2002 | Frasson et al. |
| 6,363,062 B1 | 3/2002 | Aaronson et al. |
| 6,370,355 B1 | 4/2002 | Ceretta et al. |
| 6,374,237 B1 | 4/2002 | Reese |
| 6,381,444 B1 | 4/2002 | Aggarwal et al. |
| 6,401,075 B1 | 6/2002 | Mason et al. |
| 6,438,632 B1 | 8/2002 | Kikugawa |
| 6,460,036 B1 | 10/2002 | Herz |
| 6,470,353 B1 | 10/2002 | Yaung et al. |
| 6,480,885 B1 | 11/2002 | Olivier |
| 6,554,618 B1 | 4/2003 | Lockwood |
| 6,560,578 B2 | 5/2003 | Eldering |
| 6,606,479 B2 | 8/2003 | Cook et al. |
| 6,658,415 B1 | 12/2003 | Brown et al. |
| 6,684,212 B1 | 1/2004 | Day et al. |
| 6,691,106 B1 | 2/2004 | Sathyanarayan |
| 6,691,153 B1 | 2/2004 | Hanson et al. |
| 6,704,320 B1 | 3/2004 | Narvaez et al. |
| 6,718,369 B1 | 4/2004 | Dutta |
| 6,725,203 B1 | 4/2004 | Seet et al. |
| 6,741,980 B1 | 5/2004 | Langseth et al. |
| 6,757,691 B1 | 6/2004 | Welsh et al. |
| 6,766,362 B1 | 6/2004 | Miyasaka et al. |
| 6,807,558 B1 | 10/2004 | Hassett et al. |
| 6,825,945 B1 | 11/2004 | Silverbrook et al. |
| 6,826,534 B1 | 11/2004 | Gupta et al. |
| 6,842,773 B1 | 1/2005 | Ralston et al. |
| 6,845,273 B1 | 1/2005 | Taylor |
| 6,892,226 B1 | 5/2005 | Tso et al. |
| 6,920,617 B2 | 7/2005 | Nitta |
| 6,954,783 B1 | 10/2005 | Bodwell et al. |
| 6,973,462 B2 | 12/2005 | Dattero et al. |
| 6,988,839 B1 | 1/2006 | Yu |
| 7,031,651 B2 | 4/2006 | McCormick et al. |
| 7,032,022 B1 | 4/2006 | Shanumgam et al. |
| 7,035,926 B1 | 4/2006 | Cohen et al. |
| 7,120,590 B1 | 10/2006 | Eisen et al. |
| 7,127,741 B2 | 10/2006 | Bandini et al. |
| 7,162,522 B2 | 1/2007 | Adar et al. |
| 7,328,216 B2 | 2/2008 | Hofmann et al. |
| 7,464,147 B1 | 12/2008 | Fakhouri et al. |
| 7,577,665 B2 | 8/2009 | Ramer et al. |
| 7,640,336 B1 | 12/2009 | Lu et al. |
| 7,676,542 B2 | 3/2010 | Moser et al. |
| 7,765,481 B2 | 7/2010 | Dixon et al. |
| 7,814,426 B2 | 10/2010 | Huesken et al. |
| 7,881,315 B2 | 2/2011 | Haveson et al. |
| 7,904,322 B2 | 3/2011 | Gauger |
| 8,055,663 B2 | 11/2011 | Tsai et al. |
| 8,185,940 B2 | 5/2012 | Bowers et al. |
| 2001/0037367 A1 | 11/2001 | Iyer |
| 2001/0037407 A1 | 11/2001 | Dragulev et al. |
| 2002/0013836 A1 | 1/2002 | Friedman et al. |
| 2002/0038246 A1 | 3/2002 | Nagaishi |
| 2002/0040374 A1 | 4/2002 | Kent |
| 2002/0049806 A1 | 4/2002 | Gatz et al. |
| 2002/0064767 A1 | 5/2002 | McCormick et al. |
| 2002/0076025 A1 | 6/2002 | Liversidge et al. |
| 2002/0100808 A1 | 8/2002 | Norwood et al. |
| 2002/0119434 A1 | 8/2002 | Beams et al. |
| 2002/0123334 A1 | 9/2002 | Borger et al. |
| 2002/0140732 A1 | 10/2002 | Tveskov |
| 2002/0161770 A1 | 10/2002 | Shapiro et al. |
| 2002/0169782 A1 | 11/2002 | Lehmann et al. |
| 2002/0169954 A1 | 11/2002 | Bandini et al. |
| 2002/0174230 A1 | 11/2002 | Gudorf et al. |
| 2002/0184092 A1 | 12/2002 | Cherry et al. |
| 2003/0029911 A1 | 2/2003 | Kitayama |
| 2003/0050986 A1 | 3/2003 | Matthews et al. |
| 2003/0093518 A1 | 5/2003 | Hiraga |
| 2003/0110215 A1* | 6/2003 | Joao ............... G09B 7/02 709/203 |
| 2003/0164849 A1 | 9/2003 | Barrie et al. |
| 2003/0207245 A1 | 11/2003 | Parker |
| 2003/0227479 A1 | 12/2003 | Mizrahi et al. |
| 2004/0001087 A1 | 1/2004 | Warmus et al. |
| 2004/0014017 A1 | 1/2004 | Lo |
| 2004/0030781 A1 | 2/2004 | Etesse et al. |
| 2004/0039814 A1 | 2/2004 | Crabtree et al. |
| 2004/0049554 A1 | 3/2004 | Watanabe |
| 2004/0064515 A1 | 4/2004 | Hockey |
| 2004/0103118 A1 | 5/2004 | Irving et al. |
| 2004/0103122 A1 | 5/2004 | Irving et al. |
| 2004/0103137 A1 | 5/2004 | Irving et al. |
| 2004/0104933 A1 | 6/2004 | Friedrich et al. |
| 2004/0111423 A1 | 6/2004 | Irving et al. |
| 2004/0122692 A1 | 6/2004 | Irving et al. |
| 2004/0128624 A1 | 7/2004 | Arellano et al. |
| 2004/0141005 A1 | 7/2004 | Banatwala et al. |
| 2004/0145770 A1 | 7/2004 | Nakano et al. |
| 2004/0167794 A1 | 8/2004 | Shostack |
| 2004/0174392 A1 | 9/2004 | Bjoernsen et al. |
| 2004/0186738 A1 | 9/2004 | Reisman |
| 2004/0205578 A1 | 10/2004 | Wolff et al. |
| 2005/0014121 A1 | 1/2005 | Eck et al. |
| 2005/0014122 A1* | 1/2005 | Ruvinsky et al. ............ 434/350 |
| 2005/0033657 A1 | 2/2005 | Herrington et al. |
| 2005/0071328 A1 | 3/2005 | Lawrence |
| 2005/0079477 A1 | 4/2005 | Diesel et al. |
| 2005/0105134 A1 | 5/2005 | Moneypenny et al. |
| 2005/0165743 A1 | 7/2005 | Bharat et al. |
| 2005/0166143 A1 | 7/2005 | Howell |
| 2005/0216336 A1 | 9/2005 | Roberts et al. |
| 2005/0216556 A1* | 9/2005 | Manion ............... H04L 65/1073 709/204 |
| 2005/0227216 A1 | 10/2005 | Gupta |
| 2005/0240580 A1 | 10/2005 | Zamir et al. |
| 2005/0246211 A1 | 11/2005 | Kaiser |

(56) References Cited

U.S. PATENT DOCUMENTS

| | | | |
|---|---|---|---|
| 2005/0251494 A1 | 11/2005 | Maria Jansen | |
| 2005/0262094 A1 | 11/2005 | Beartusk et al. | |
| 2005/0266388 A1 | 12/2005 | Gross et al. | |
| 2005/0288943 A1 | 12/2005 | Wei et al. | |
| 2006/0020662 A1 | 1/2006 | Robinson | |
| 2006/0031087 A1 | 2/2006 | Fox et al. | |
| 2006/0031497 A1 | 2/2006 | Beartusk et al. | |
| 2006/0052057 A1 | 3/2006 | Persson et al. | |
| 2006/0062157 A1 | 3/2006 | Yamamoto | |
| 2006/0115800 A1 | 6/2006 | Daley | |
| 2006/0134593 A1 | 6/2006 | Kalous et al. | |
| 2006/0240856 A1* | 10/2006 | Counts | H04W 4/08 455/518 |
| 2006/0242234 A1 | 10/2006 | Counts et al. | |
| 2006/0242581 A1 | 10/2006 | Manion et al. | |
| 2006/0246197 A1 | 11/2006 | Kshirsagar et al. | |
| 2006/0248197 A1 | 11/2006 | Evans et al. | |
| 2006/0252547 A1* | 11/2006 | Mizrahi | A63F 13/10 463/42 |
| 2006/0253533 A1 | 11/2006 | Bursztein et al. | |
| 2006/0253572 A1 | 11/2006 | Gomez et al. | |
| 2007/0027973 A1 | 2/2007 | Stein et al. | |
| 2007/0130339 A1 | 6/2007 | Alcorn et al. | |
| 2007/0136423 A1 | 6/2007 | Gilmore et al. | |
| 2007/0192299 A1 | 8/2007 | Zuckerberg et al. | |
| 2007/0224585 A1 | 9/2007 | Gerteis et al. | |
| 2007/0231782 A1 | 10/2007 | Ozawa et al. | |
| 2007/0245349 A1 | 10/2007 | Sinn | |
| 2007/0260671 A1 | 11/2007 | Harinstein et al. | |
| 2008/0005188 A1 | 1/2008 | Li et al. | |
| 2008/0082480 A1 | 4/2008 | Gounares et al. | |
| 2008/0126476 A1* | 5/2008 | Nicholas | G06Q 10/10 709/203 |
| 2009/0030876 A1 | 1/2009 | Hamilton | |
| 2009/0094039 A1 | 4/2009 | MacDonald et al. | |
| 2009/0307605 A1 | 12/2009 | Ryan et al. | |
| 2010/0278336 A1 | 11/2010 | Tahan et al. | |
| 2011/0016137 A1 | 1/2011 | Goroshevsky et al. | |
| 2011/0153740 A1 | 6/2011 | Smith et al. | |

FOREIGN PATENT DOCUMENTS

| | | |
|---|---|---|
| JP | 2002288187 | 10/2002 |
| JP | 2001306606 | 11/2002 |
| JP | 2005128673 | 5/2005 |
| JP | 2006065734 | 9/2006 |
| WO | 2007118231 | 10/2007 |

OTHER PUBLICATIONS ePALS Classroom Exchange First to Provide Teacher Monitored Email With Instant Language Translations, PR Newswire, Mar. 14, 2000.

ePALS Classroom Exchange partners with Canada's SchoolNet, Canada NewsWire, Nov. 23, 2000.

MessageLabs: British Government Takes on MessageLabs to Bolster Virus Protection, M2 Presswire, May 16, 2002.

Netopia: Netopia to bring parental control, content filtering and family security services to broadband service providers, M2 Presswire, Jun. 4, 2002.

Portions of http://www.ecs.syr.edu/organizations/AEW/ website and associated Internet Archive information.

Safety: Monitoring web access, The Guardian, Oct. 25, 2000, at 7.

Scholastic and ePALS Classroom Exchange Announce Agreement Connecting Global Classrooms, Business Wire, Aug. 10, 2000.

Zoraini Wati Abas, E-mail activities in the classroom, Computimes Malaysia, Apr. 26, 2001.

Portions of the file history of European patent application No. EP 7871417.7.

Portions of the file history of Patent Cooperation Treaty (PCT) international patent application No. PCT/IB07/04578.

Portions of the file history of Patent Cooperation Treaty (PCT) international patent application No. PCT/US07/84189.

Portions of the file history of U.S. Appl. No. 11/937,495.

Portions of the file history of U.S. Appl. No. 11/937,497.

Portions of the file history of U.S. Appl. No. 11/937,499.

United States Patent and Trademark Office, Non-Final Office Action, dated Feb. 10, 2012, U.S. Appl. No. 11/937,495, filed Nov. 8, 2007, Linda T. Dozier et al.

United States Patent and Trademark Office, Non-Final Office Action, dated Apr. 17, 2012, U.S. Appl. No. 11/402,830, filed Apr. 13, 2006, Osmani Gomez et al.

Official Notice of Rejection dated Jan. 11, 2013 for Japanese Patent Application No. 2009-536506.

Ivan Cantador, et al.; "Multilayered Semantic Social Network Modeling by Ontology-Based User Profiles Clustering: Application to Collaborative Filtering", Jan. 1, 2006 (Jan. 1, 2006), Managing Knowledge in a World of Networks Lecture Notes in Computer Science; Lecture Notes in Artificial Intellig Ence; LNCS, Sringer, Berlin, DE, pp. 334-349, XP019045784.

Supplementary European Search Report Issued for EP Patent Application No. EP07871417 dated Feb. 12, 2013.

United States Patent and Trademark Office, Final Office Action, dated Dec. 18, 2013, U.S. Appl. No. 11/937,495, filed Nov. 8, 2007, Linda Dozier, et al.

Japanese Patent Office, Notice of Rejection, dated Dec. 24, 2013, Japanese Application No. 2012-271707, filed Dec. 12, 2012, ePals, Inc.

Office Action dated Jul. 8, 2014 in U.S. Appl. No. 14/050,418, filed Oct. 10, 2013.

Response filed Apr. 24, 2014 to Notice of Rejection dated Dec. 24, 2013 in Japanese Application No. 2012-271707, filed Dec. 12, 2012.

Response filed Jun. 18, 2014 to Office Action dated Dec. 18, 2013 in U.S. Appl. No. 11/937,495, filed Nov. 8, 2007.

Office Action dated Aug. 26, 2014 in U.S. Appl. No. 11/937,499, filed Nov. 8, 2007.

Office Action dated Aug. 27, 2014 in U.S. Appl. No. 11/937,497, filed Nov. 8, 2007.

Office Action dated Sep. 11, 2014 in U.S. Appl. No. 11/937,495, filed Nov. 8, 2007.

Office Action dated Oct. 9, 2014 in U.S. Appl. No. 14/255,334, filed Apr. 17, 2014.

Response filed Mar. 11, 2015 to Office Action dated Sep. 11, 2014 in U.S. Appl. No. 11/937,495, filed Nov. 8, 2007.

Response filed Apr. 8, 2015 to Office Action dated Oct. 9, 2014 in U.S. Appl. No. 14/255,334, filed Apr. 17, 2014.

Office Action dated May 6, 2015 in U.S. Appl. No. 14/050,418, filed Apr. 17, 2014.

Office Action dated Jun. 10, 2015 in U.S. Appl. No. 11/937,497, filed Nov. 8, 2007.

Office Action dated Jun. 9, 2010 in U.S. Appl. No. 11/937,495.

Office Action dated Mar. 22, 2011 in U.S. Appl. No. 11/937,495.

Office Action dated May 23, 2013 in U.S. Appl. No. 11/937,495.

Office Action dated Jul. 8, 2015 in U.S. Appl. No. 11/937,495.

Office Action dated Jun. 16, 2016 in U.S. Appl. No. 11/937,495.

Office Action dated Apr. 28, 2017 in U.S. Appl. No. 11/937,495.

Response to Office Action filed Dec. 9, 2010 in U.S. Appl. No. 11/937,495.

Response to Office Action filed Sep. 22, 2011 in U.S. Appl. No. 11/937,495.

Response to Office Action filed Nov. 25, 2013 in U.S. Appl. No. 11/937,495.

Response to Office Action filed Jan. 8, 2016 in U.S. Appl. No. 11/937,495.

Office Action dated Mar. 21, 2011 in U.S. Appl. No. 11/937,499.

Office Action dated Sep. 13, 2012 in U.S. Appl. No. 11/937,499.

Office Action dated Jun. 27, 2013 in U.S. Appl. No. 11/937,499.

Office Action dated Jun. 22, 2015 in U.S. Appl. No. 11/937,499.

Office Action dated Feb. 1, 2016 in U.S. Appl. No. 11/937,499.

Office Action dated Jul. 28, 2017 in U.S. Appl. No. 11/937,499.

Response to Office Action filed Jul. 21, 2011 in U.S. Appl. No. 11/937,499.

Response to Office Action filed Mar. 13, 2013 in U.S. Appl. No. 11/937,499.

(56) References Cited

OTHER PUBLICATIONS

Response to Office Action filed Dec. 26, 2013 in U.S. Appl. No. 11/937,499.
Response to Office Action filed Apr. 3, 2014 in U.S. Appl. No. 11/937,499.
Response to Office Action filed Feb. 26, 2015 in U.S. Appl. No. 11/937,499.
Response to Office Action filed Dec. 22, 2015 in U.S. Appl. No. 11/937,499.
Office Action dated Jan. 10, 2008 in U.S. Appl. No. 11/402,830.
Office Action dated Sep. 4, 2008 in U.S. Appl. No. 11/402,830.
Office Action dated Jun. 24, 2009 in U.S. Appl. No. 11/402,830.
Office Action dated Mar. 17, 2010 in U.S. Appl. No. 11/402,830.
Office Action dated Jan. 9, 2013 in U.S. Appl. No. 11/402,830.
Response to Office Action filed Jun. 10, 2008 in U.S. Appl. No. 11/402,830.
Response to Office Action filed Mar. 4, 2009 in U.S. Appl. No. 11/402,830.
Response to Office Action filed Dec. 23, 2009 in U.S. Appl. No. 11/402,830.
Response to Office Action filed Sep. 16, 2010 in U.S. Appl. No. 11/402,830.
Response to Office Action filed Oct. 17, 2012 in U.S. Appl. No. 11/402,830.
Response to Office Action filed Jul. 11, 2017 in U.S. Appl. No. 11/402,830.
Office Action dated Dec. 5, 2012 in U.S. Appl. No. 12/902,219.
Office Action dated May 9, 2013 in U.S. Appl. No. 12/902,219.
Office Action dated Apr. 30, 2014 in U.S. Appl. No. 12/902,219.
Office Action dated Dec. 23, 2014 in U.S. Appl. No. 12/902,219.
Office Action dated Aug. 24, 2015 in U.S. Appl. No. 12/902,219.
Office Action dated Mar. 24, 2016 in U.S. Appl. No. 12/902,219.
Response to Office Action filed Mar. 5, 2013 in U.S. Appl. No. 12/902,219.
Response to Office Action filed Jul. 9, 2013 in U.S. Appl. No. 12/902,219.
Response to Office Action filed Feb. 24, 2016 in U.S. Appl. No. 12/902,219.
Response to Office Action filed Oct. 3, 2013 in U.S. Appl. No. 12/902,219.
Response to Office Action filed Oct. 29, 2014 in U.S. Appl. No. 12/902,219.
Response to Office Action filed Jun. 23, 2015 in U.S. Appl. No. 12/902,219.
International Preliminary Report and Written Opinion dated Dec. 2, 2010 for International Patent Application No. PCT/US10/52251.
International Search Report and Written Opinion dated Dec. 2, 2010 for International Application No. PCT/US10/52251.
International Search Report and Written Opinion dated Jun. 16, 2009 for International Application No. PCT/US09/43360.
International Search Report and Written Opinion dated Jun. 18, 2008 for International Application No. PCT/US07/84189.
Office Action dated Dec. 30, 2013 in Chinese Appliction No. 201080056528.0.
Office Action dated Nov. 15, 2014 in Chinese Application No. 201080056528.0.
Response to Office Action filed Mar. 19, 2015 in Chinese Application No. 201080056528.0.
Supplementary European Search Report dated Feb. 18, 2013 for EP Application No. 10823921.

\* cited by examiner

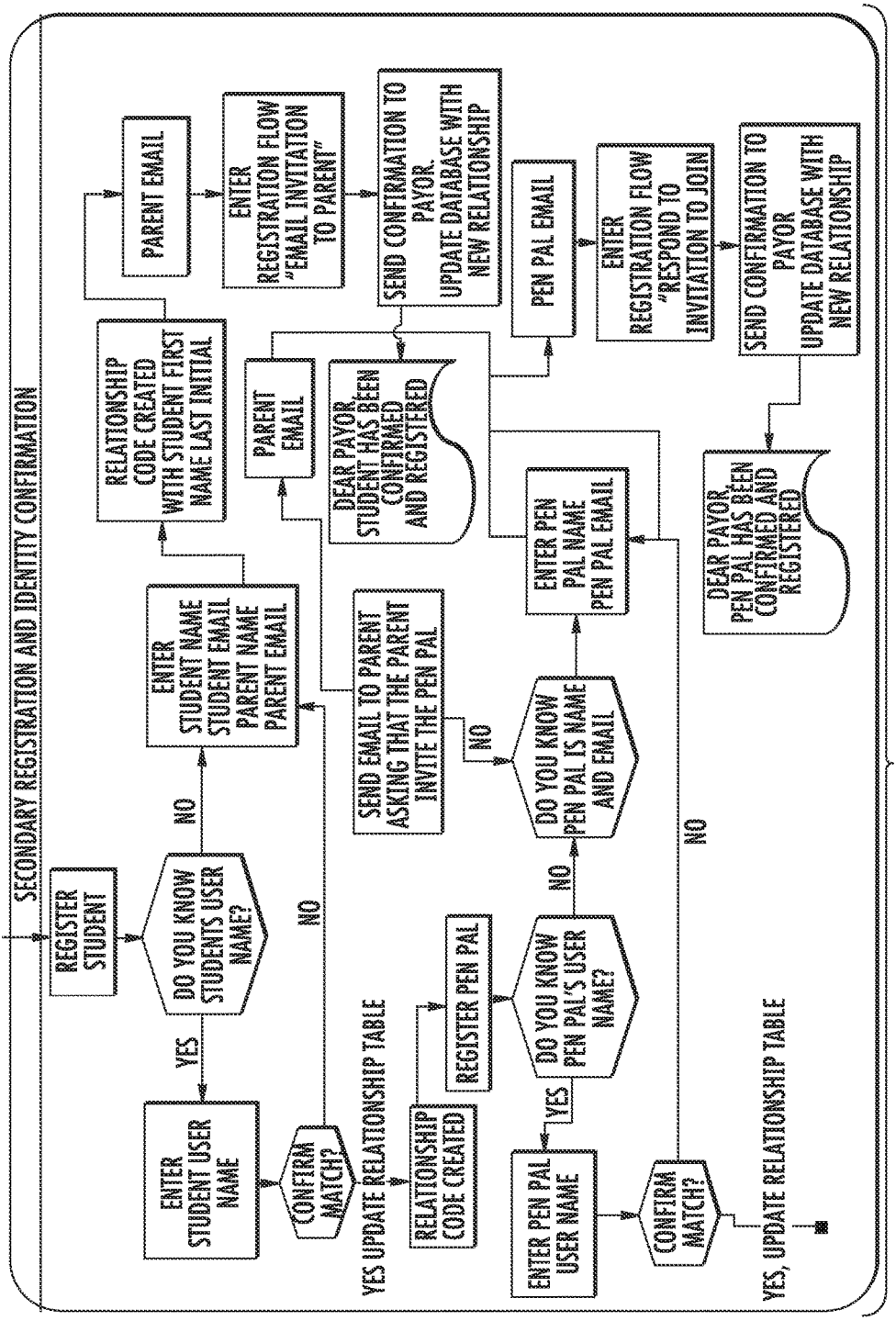

DYNAMIC CHARACTERIZATION OF NODES IN A SEMANTIC NETWORK FOR DESIRED FUNCTIONS SUCH AS SEARCH, DISCOVERY, MATCHING, CONTENT DELIVERY, AND SYNCHRONIZATION OF ACTIVITY AND INFORMATION

CROSS REFERENCE TO RELATED APPLICATIONS

The present application is a continuation of U.S. patent application Ser. No. 11/937,495, filed on Nov. 8, 2007, in the name of Dozier, et al., and entitled "Dynamic Characterization of Nodes in a Semantic Network for Desired Functions Such As Search, Discovery, Matching, Content Delivery, and Synchronization of Activity and Information," which claims the benefit of U.S. patent applications Nos. 60/857,560, 60/857,570, and 60/857,583, each of which was filed on Nov. 8, 2006, in the name of Gilburne, et al. The entire disclosure of each of the foregoing applications is hereby incorporated by reference as if set forth verbatim in its entirety herein and relied upon for all purposes.

FIELD OF THE INVENTION

This invention generally relates to networks, and more specifically, to determining similarity between nodes in a network.

This invention also generally relates to a system and method of delivering a dynamic, process-based learning experience using computers, storage, and networks to coordinate, record, and manage the state transitions between participants. Specifically, the invention relates to process-based learning systems involving methods of dynamic interaction between participants in a collaborative social network where content, presentation, curriculum, and/or the like are tailored to the participants and their roles in the social network.

This invention also relates generally to methods and systems of learning management and, specifically, to a method and system for process-based learning within a social network.

BACKGROUND OF THE INVENTION

The connection between nodes in a network, using electronic means to interconnect the nodes, is based on a set of binary relationships. That is, either there is an arc connecting two nodes or there is not. If an arc is present, the distance between the nodes is one. The measurement between any two nodes is uniform, such that a node located between two other nodes is considered to be equally related to both regardless of the similarities or differences between the three. Such systems are unable to express similarity between nodes based on the distance between nodes as determined by pair-wise comparison of the attributes of the nodes. Moreover, such systems are unable to recalculate the distance (i.e., the similarity) between nodes based on dynamic redefinition of the relationship between the nodes or their attributes. Such systems are therefore unable to synchronize nodes in terms of their similarity or in terms of changes to the nodes' attributes based on events, actions, or states of and between the nodes. Such systems are also unable to discover or infer that a node is more or less similar to one node versus another given a set of constraints, and search for nodes that are similar or within a defined distance from each other.

Traditional learning management systems ("LMSs") provide an integrated system with tools to organize and administer electronic learning courses. Activities and materials managed by an LMS usually include enrollment, management of assignments, lesson plans, syllabi, discussion forums, file sharing, chats, etc. Contrary to the present invention, traditional LMSs focus on the administration of enrollment and curriculum rather than on management of the participants in social networks of learning.

Most social networks are organized for self-expression and are not used as platforms for online learning. Although many of the technologies used for social networking (e.g., wikis and weblogs) are readily available, social networks with embedded curricula or that specifically address online learning, have not been established.

Again, contrary to the present invention, traditional e-learning systems generally support lesson-oriented curricula rather than providing a framework and tools for self-directed acquisition of knowledge within a network of learner participants.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 5 through 16 are graphical representations of an interface of a system for developing literacy skills in accordance with an embodiment of the present invention;

FIGS. 17A, 17B, and 17C illustrate a flowchart showing the steps of the registration flow for the program, including secondary registration and identity confirmation as well as the book buying configuration.

Figure 1:
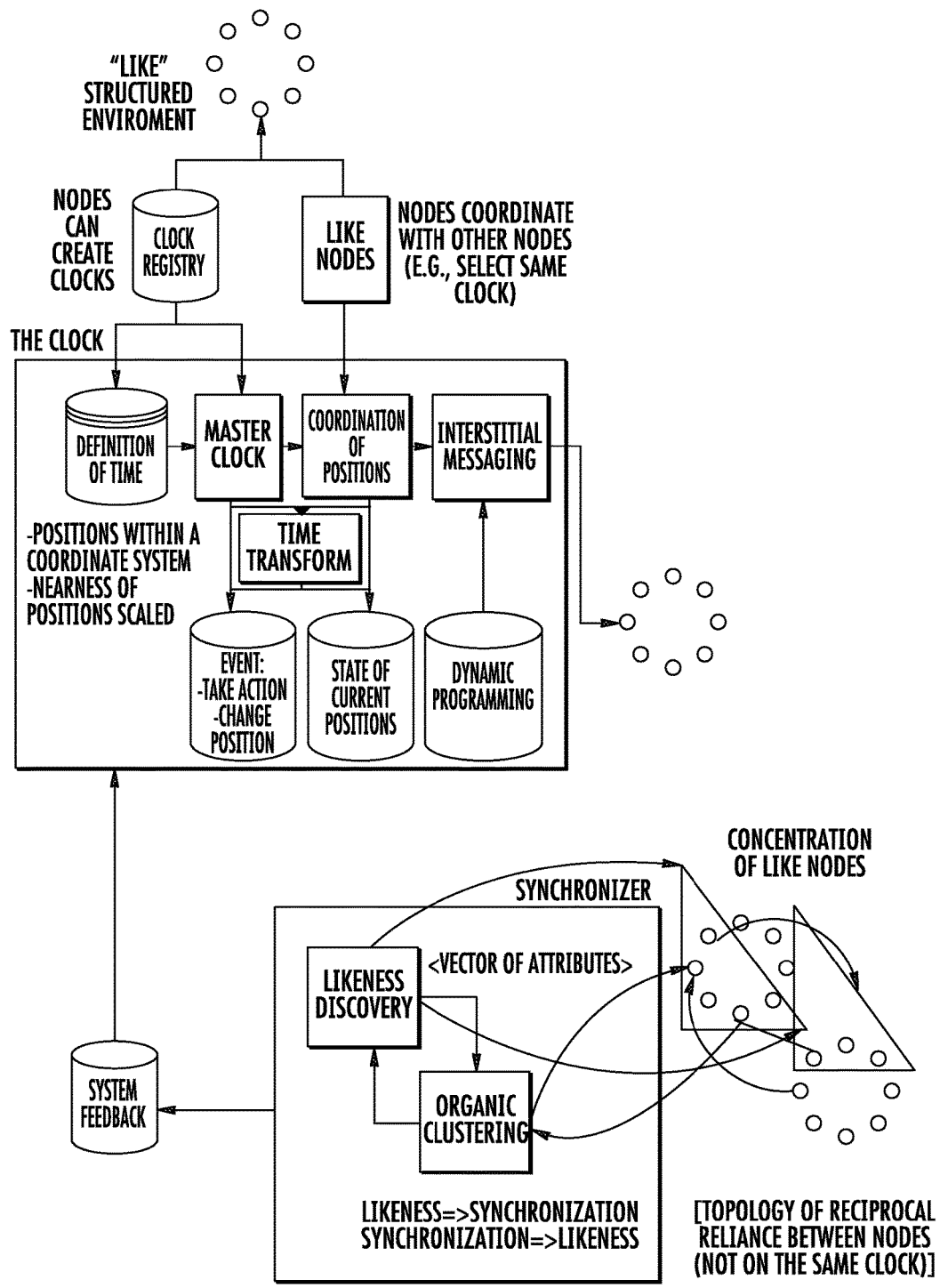
FIG. 1 is a flowchart of an exemplary system for dynamically characterizing nodes in a semantic network and coordinating activities or information among them.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

While the invention may be used for a variety of purposes such as finding groups of similar nodes, making connections between nodes based on similarity, synchronizing the activity of nodes based on their similarity, and to make information available to similarly-situated nodes, one specific embodiment relates to a system and method of creating and operating a social learning network. For the purposes of this example and the present disclosure, copending patent application entitled "System for Developing Literacy Skills Using Loosely Coupled Tools in a Self-Directed Learning Process within a Collaborative Social Network," filed simultaneously herewith and bearing Attorney Docket No. 28849/09004 is incorporated by reference herein in its entirety. The present system and method may be incorporated, in one embodiment, into the learning process within the collaborative social network described therein.

The present invention is a system and related method for dynamically characterizing nodes in a network and measuring the distance between them. The measured distance between two nodes identifies the similarities between the nodes based on one or more attributes of the nodes, which may be weighted such that one attribute is determined to be more important than another. The distance between two nodes is determined based on a type of relationship between the nodes' attributes identified from semantic or other information, rather than a binary relationship based on whether the value of an attribute of the first node matches the value of an attribute of the second node. In other words, the distance may be based on the degree of similarity between the values of each attribute of one node compared to the values of similar attributes of another node. The degree of similarity between the attribute values can be determined semantically or established from other information, such as a predefined set of relationship nodes. As a result, the relationship between each attribute is not determined based on a connected-or-not state (i.e., whether the attribute values match), but on a degree of similarity between the values and attributes. The distance between nodes is dynamic, thereby changing depending on what attributes are defined as important for a given goal, or based on changes to the attributes themselves.

A node in the network, N, may be a user, software agent, machine, a process, or combinations of the foregoing; essentially any logical grouping that can serve as a locus for attributes, discovery, rules, processes, etc. Each node is characterized by a vector of attributes $$N=[x_1 x_2 \ldots x_n]$$

where, x values are the node's attributes that characterize the node, not coordinate points in the traditional sense. An attribute, such as $x_1$, is information that can be collected, either actively or passively, and associated with one or more nodes. Each node can be associated with an infinite amount of attributes, but not all attributes may contain a value for a specific node. An example of a subset of attributes that may be relevant to the presently-described embodiment of a social learning network may include rating, time, level of expertise, age, grade, current assignment, education level, subject-matter, interest, etc. Attributes of a node may be supplied directly or derived indirectly through analysis of the attributes of similar nodes or analysis of the attributes of a given node, at least in part for the purpose of associating other information with the node. For example, other nodes in a network may possess a common attribute that may be inferred to a specific attribute, or a node may have previously interacted with a number of other nodes, where such interaction may itself become an attribute. The values of the attributes are dynamic and can be updated based on the activities, interactions, or lack thereof between a node and other nodes in the network. In order to calculate the similarity between nodes using this dynamic set of attributes, the attributes of the node are represented as scalar values. That is, an attribute may be defined by a number of non-numerical values, such as "male" or "female" for a "gender" attribute for purposes of the current example. These non-numerical values are represented as scalar values, for example, "male" would receive the value of two (2), while "female" would receive the value of three (3) for the present example.

Thus, the attribute matrix described above for node N may be represented by a vector of scalar values, which represent values of the corresponding attributes. The scalar vector enables calculation of the similarity, or distance, between nodes by determining the difference of similar attributes. The difference between a specific attribute of two nodes is represented by the absolute value of the difference between the attributes, or $$|x_1 - x_1|$$

such that the first $x_1$ represents the scalar value of an attribute of one node, while the second $x_1$ represents the scalar value of a similar attribute of another node.

A measure of similarity, or distance, between two nodes is determined according to the formula:

$$(\Delta s)^2 = g_{11}(\Delta x_1)^2 + g_{12}\Delta x_1 \Delta x_2 + \ldots + g_{1n}\Delta x_1 \Delta x_n + g_{21}\Delta x_2 \Delta x_1 + $$
$$g_{22}(\Delta x_2)^2 + \ldots + g_{nn}(\Delta x_n)^2$$
$$= \sum_{i=1}^{d} \sum_{j=1}^{d} g_{ij} \Delta x_i \Delta x_j$$

where d is the length of the x vectors (i.e., the number of attributes for the nodes) and g is a weighting factor for each attribute comparison as described in more detail below.

The measure of similarity between nodes can be used to discover, search, group, synchronize as to other nodes, time, other information, or a number of factors, or determine, at least in part, the delivery of content, such that the similarity calculated between two nodes may be used to suggest and provide action, activities, or information for use and/or consumption to similarly-situated nodes.

The invention allows the definition of which pairs of attributes are more important or less important when determining similarity between two nodes by providing a weight to each comparison of two attributes using the coefficient g. The coefficient g is a matrix where the number of rows and the number of columns are equal to the number of attributes $x_n$, of each node N, such that:

$$g = \begin{bmatrix} g_{11} & g_{12} & \cdots & g_{1a} \\ g_{21} & g_{22} & \cdots & g_{2a} \\ \vdots & \vdots & \ddots & \vdots \\ g_{b1} & g_{b2} & \cdots & g_{ab} \end{bmatrix}$$

where $g_{ab}$ is the weighting factor for the comparison between an attribute $x_a$ of a first node and an attribute $x_b$ of a second node. Thus, the coefficient g is a matrix of weighting factors that allows the system to define which comparison of attributes of two nodes are more important and which are less important when determining the distance, or overall similarity, between two nodes. The coefficient g also allows the measured similarity to be configured based on which attributes are important for a specific circumstance. Thus, another coefficient g may be used to measure the similarity between two nodes by applying a different weighting coefficient to a different set of attributes. For any coefficient g, a value of zero (0) at a specific location indicates that the comparison of the corresponding attribute of one node to a corresponding attribute of another node is unimportant for determining the similarity between the nodes based on the chosen set of attributes. Thus, the coefficient g may vary because some relationships are more important than others in determining whether two nodes are similar to each other for given circumstances. The weights established by the coefficient g may vary over time and may be specified as a defined input. In another embodiment, the weights provided by the coefficient g may be provided dynamically by a user who, for example, may be searching for similar nodes and choose to weight the comparison of attributes based on the user's desired goal. In yet a further embodiment, the system generates a coefficient g matrix based on a user's ranking of the similarity, or distance, between a set of nodes. In other words, the attributes for the set of nodes is known, and the user defines the distance between the nodes, thereby allowing the system to solve for the corresponding g matrix.

In another embodiment, a value of one (1) may be provided for all specific g values, thereby indicating that all attribute comparison should be weighted equally. In this embodiment, the g matrix may be removed from the above described equation.

In another embodiment, calculation of the distances between nodes may be pursuant to a search, such that the relevant attributes for the search are selected and criteria corresponding to the selected attributes are provided. A weight for the comparison of each of the desired attributes may also be provided. The search results are ordered based on the calculated distances and, if the number of attributes selected are less than four (4), may be displayed graphically. The user may alter the relevant attributes, which attributes should be compared and how, and/or the weighted comparison values to dynamically change the calculated distances and, thus, the corresponding search results.

In the particular embodiment described herein as an example, nodes $N_1$, $N_2$, and $N_3$ of the system are the participants of a social network. In the social learning network, definitions of "nearness" that might affect similarity may include attributes related to the participants, such as the participant's age and education level. The below example is by way of an explanation and it should be understood, therefore, that the details below, such as the number of attributes for each participant, should not be limiting. For this example, each participant is defined by a vector with seven (7) attributes to characterize each node, such that $N=[x_1, x_2, x_3, x_4, x_5, x_6, x_7]$ where $x_1$ represents the age of the corresponding participant; $x_2$ represents the participant's education level; $x_3$, the games played by the participant; $x_4$, the participant's music interest; $x_5$, the amount of time spent online by the participant; $x_6$, the interactive games won by the participant; and $x_7$ represents the number of reading genres studied by the participant. Thus, three exemplary participants within the social learning network of the present example may be identified as:

$N_1$=[40 yrs old, PhD in Chemistry, Go, listens to classical music, online everyday, 5 wins, 3 genres]

$N_2$=[10 yrs old, completed Calculus, Scrabble, plays violin, moderate internet use, 0 wins, 7 genres]

$N_3$=[22 yrs old, Chemistry student, Go, listens to rock music, moderate internet use, 0 wins, 5 genres]

As described above, the attributes are represented as scalar values before comparing the attributes. Attribute values and their scalar translation may be assigned by application software or derived from another data source, such as a semantic network similar to WordNet developed by Princeton University. In this embodiment, all of the words in a semantic database have been tagged with scalar values that correspond to the semantic relationship between words. Thus, use of a semantic database enables at least in part inferring attributes based on words that are similar or related in meaning. Given our example, we assume lookup of the following values:

| Attribute Position | Attribute | Scalar Values |
|---|---|---|
| $x_1$ | Age | Actual age |
| $x_2$ | Education level | Bachelor of Science = 16 |
| | | Master of Science = 17 |
| | | PhD = 18 |
| | | Math = 100 |
| | | Chemistry = 125 |
| | | English = 25 |
| $x_3$ | Games played | Scrabble = 1 |
| | | Go = 5 |
| | | Chess = 10 |
| | | Chess Master = 20 |
| $x_4$ | Music interest | Listens = 1 |
| | | Plays instrument = 10 |
| | | Classical = 10 |
| | | Non-classical = 5 |
| $x_5$ | Online use | Daily = 5 |
| | | Frequent = 4 |
| | | Moderate = 3 |
| | | Occasional = 2 |
| | | Rarely = 1 |
| | | None = 0 |
| $x_6$ | Wins | Numerical count of number of wins |
| $x_7$ | Genres read | Numerical count of number of different genres read |

Given the assignment of the above scalar values to the attributes of the current example, nodes $N_1$, $N_2$, and $N_3$ are characterized as follows:

$N_1$=[40,143,5,11,5,5,3]
$N_2$=[10,100,1,20,3,0,7]
$N_3$=[22,125,5,6,3,0,5]

The assignment of values may be dynamically updated by the system based on events, changes in the state of a node or nodes, or other information. For example, if a user's date of birth is part of the user's profile, the system may update the user's age, or may increment the count of games won each time the user wins an interactive game. Additionally, if usage increases or decreases, the system may change the value associated with the user's online usage attribute, or the system may increment the value of the attribute associated with the number of genres read each time the user orders a book of a new genre or participates in a reading project with a new genre.

In one embodiment, the g matrix acts as selection criteria by driving the definition of how close or how far nodes are from each other based, at least in part, upon relative weighting or importance for a particular objective. g is a contextually relevant expression to select and define similarity within the context of a specific project or activity that is either specified by a user or generated passively. In the current examples set forth below, the similarity between nodes $N_1$, $N_2$, and $N_3$ is calculated within the context of two objectives: (1) finding a "good" partner for an online chess game, where "good" indicates that the opponent is likely to provide a competitive match, and (2) finding $N_2$ the best mentor for a science fair.

Given the attributes that characterize the nodes, we may weight the relative importance of the attributes as follows in order to find a good chess game partner:

| Specific g coefficient | Attribute | Weight |
|---|---|---|
| $g_{11}$ | Age | 2 |
| $g_{22}$ | Education level | 4 |
| $g_{33}$ | Games played | 10 |
| $g_{44}$ | Music preferences | 3 |
| $g_{55}$ | Online usage | 10 |
| $g_{66}$ | Wins | 10 |
| $g_{77}$ | Genres | 0 |

It should be understood that, for the above g matrix, the comparison of non-identical attributes (e.g., the comparison of the age of $N_1$ to the games played by $N_2$) is unimportant for the current objectives and, thus, the corresponding specific g coefficients, such as $g_{12}$, for the weight of non-identical attribute comparisons have been provided a value of zero (0), thereby removing these comparisons from the analysis for the current example, but it should also be understood that such comparisons may be relevant in certain circumstances and, thus, those comparisons may be weighted by providing a positive value for the corresponding g coefficient.

Based on the above exemplary g matrix, the equation described above used to identify the similarities between two nodes produces the following distances between each node:

|  | $N_1$ | $N_2$ | $N_3$ |
|---|---|---|---|
| $N_1$ | 0 | 31.4 | 15.2 |
| $N_2$ | 31.4 | 0 | 18.8 |
| $N_3$ | 15.2 | 18.8 | 0 | thereby indicating that nodes $N_1$ and $N_3$ are the most similar and would therefore make the best match with respect to a chess game.

Alternatively, when finding the best mentor for $N_2$ for the science fair, a possible weighting of the importance of the characteristics of the nodes may be:

| Specific g coefficient | Attribute | Weight |
|---|---|---|
| $g_{11}$ | Age | 10 |
| $g_{22}$ | Education level | 8 |
| $g_{33}$ | Games played | 3 |
| $g_{44}$ | Music preferences | 1 |
| $g_{55}$ | Online usage | 3 |
| $g_{66}$ | Wins | 0 |
| $g_{77}$ | Genres | 0 |

This g matrix indicates that age and education level are important factors and, thus, provided a greater weight, while the number of online games won and the number of different genres of books read are unimportant factors and, thus, given a weight of zero (0), thereby removing these attributes from the analysis for the current objective. The results of the distances between the nodes for this objective are:

|  | $N_1$ | $N_2$ | $N_3$ |
|---|---|---|---|
| $N_1$ | 0 | 48.9 | 24.2 |
| $N_2$ | 48.9 | 0 | 25.9 |
| $N_3$ | 24.2 | 25.9 | 0 | thereby indicating that the closest node to $N_2$ is $N_3$. The only attribute where $N_1$ is closer to $N_2$ is that for music. If a g coefficient was defined that provided a greater weight for the interest in music attribute when selecting a mentor, the result could change.

Both of the above examples demonstrate the system's ability to infer similarity in the absence of any exact match of "selection" criteria and to express the differences between members of a set, rather than a simple ranking of results. For example, if two nodes communicate frequently, the system may infer that the nodes "know" each other and are close to each other. As a result, the system may create a "basis" for inferring by, for example, comparing the nodes' attributes. This allows the system to generate probabilities and inferences based on large-scale analysis of attributes, comparison between nodes, and downstream seeding and ultimately testing of inferences.

Prior to determining the distances between the relevant nodes, the desired nodes must be selected from the network. In the above examples, the relevant nodes were the only nodes within the corresponding network, thereby making their selection simple. Specific nodes may be chosen, however, based on one or more selected attributes, such that execution of a query identifies nodes that have similar values for the one or more attributes. Once these nodes have been identified, the distance between each pair of nodes may be calculated for a given objective based on the above process. Alternatively, the process described above may be used to identify similarly-situated nodes under certain circumstances, chose the identified nodes, or a subset of the nodes, based on their relative proximity, and use the chosen nodes for further distance calculations based on another or other objectives. These groups of selected nodes may be referred to as a cluster of nodes, which merely denotes that a set of nodes have been chosen for some reason.

FIG. 1 illustrates an exemplary system configured to manage connections between nodes within a network connected by a structure, such as wide area network, specifically, the Internet, where the network is a learning community and the nodes are the community's participants.

Time in the synchronization is defined fundamentally by the stage in a project or activity of the participants in the social learning network. As in all definitions of time, the social learning network goes through a learning process, which includes progressions during which participants go through sequences of independent and interdependent actions at superimposed scales. The definition of time and the position of a node are based on the time attribute or attributes in the vector that characterizes that node. The attribute defining "time" for that node or the attributes related to time for each node may be used to calculate how close nodes are to the same "time" and then synchronize their activity or information based on that similarity using the process described above.

The system thus includes a synchronizer that can transform the time definition for a participant in the social learning network into Universal Time, and coordinate groups of participants who are operating in their own context based on different factors, including the relative time of each node. When an event occurs, i.e., a state change or transition, affecting a node or nodes, the relevant attribute or attributes of the node are updated, and their similarity to other nodes in the group are reevaluated. Attributes or events may change based on interaction with, or attributes of, nodes unrelated to the current definition of a group or the group's project. Therefore, the system monitors which participants or sub-networks are nearest one another and are, therefore, candidates for discovery and clustering based on their similarities or differences. The coordinated nodes each have a vector of dynamic attributes that are not necessarily predefined, but which can be dynamically defined based on a particular set of attributes specific to a learning activity, such as writing about a book; that is, choosing the set of x's (attributes) and the value of the g's (the weight of the comparison of the attributes) in the equation above.

Once node clusters of similarity are identified, the system targets information to those nodes. Information includes a notification that each node is part of a particular cluster and may include content, as well as links to additional content, that is related to the focus of the cluster. The system may also receive information from each node that changes the node's attributes and, thus, the current clustering.

In the particular embodiment where the reading of books by mentors and students is the type of learning activity involved, the following activities exist and are synchronized according to the present method. For the purposes of the description of this example, mentors and students may also be referred to as pen pals. The simultaneity of participation between all of the nodes helps provide a rich and unique experience for each student who is communicating, generally in writing, with a mentor or "pen pal" about the subject matter of a jointly-read book. For example, the Genre Synchronization portion of the system coordinates nodes reading in the same genre, while the Pen Pal Pairs Synchronization portion of the system coordinates nodes according to the actual timing of the delivery of letters from pen pals to students. The Individual Pen Pal Synchronization portion of the system reflects the particular interests and activities of a specific pen pal, while the Community Synchronization portion of the system provides an ongoing assortment of community related activities that may or may not be related to the genre or to the pen pal's activity, but by other measures of similarity between users participating in the same type of project.

Genre Synchronization

All participants may follow the same genre sequence so there is a set of genre-related information and activities that each participant is offered when they reach a particular point in the learning activity. For example, a week after a pen pal receives a book to read, the system operator portion of the method reminds the pen pal to check out an "About the Book" webpage which provides in-depth information about the current genre in the exemplary embodiment. As another example, when a student is waiting for their pen pal's letter, the student may be asked to participate in a genre-related field trip.

Pen Pal Pair Synchronization

Each pen pal pair has its own schedule, and individual interaction proceeds according to the book selection dates, the reading of the book, and the transfer and receipt of letters between the pen pal and student. Each pen pal pair interaction may take a different amount of time. The information available each time a user accesses the system is unique because the system reflects where a pen pal or the related student is in the learning process, as well as what activities and resources are relevant to the next interaction that is planned with respect to the student's pen pal.

Individual Pen Pal Synchronization

Although it is similar to the Pen Pal Pair Synchronization portion of the system, the Individual Pen Pal Synchronization portion of the system also includes items and activities that reflect the individual pen pal's experiences and interests. For example, if the pen pal regularly completes crossword puzzles, the pen pal may be invited to participate in a cross-community crossword challenge. The system is configured to discover all other similarly-situated pen pals (e.g., same genre, role, stage in the pen pal writing process, interest in crossword puzzles, etc.) and "synchronize" their participation, by using the method described above in one embodiment.

Community Synchronization

The Community Synchronization portion of the system constantly changes and encourages participants to interact with the community. This portion includes polls, contests, information feeds, and other multimedia and content. Using the methods of discovery and synchronization set forth above, the system is configured to deliver information or opportunities for interaction based on either individual attributes or clustering of similar people, or nodes.

Learning often occurs in collaborative social networks that may depend on content, presentation, and curriculum. The best learning often takes places when those items are tailored to the participants in the network and when those items are tailored specifically to the participants' roles. The present invention includes a method of allowing the delivery of a dynamic, tailored, process-based learning experience that involves coordinating, recording, and managing the state transitions between the participants in the learning environment. While this method has applicability to many different learning situations, it is described herein as an example based on improving literacy through an education network. That literacy program combines reading, subject matter content (such as social studies, science, folktales, etc.), and correspondence between students on the one hand and "pen pals" or mentors on the other. One embodiment of the methods of the present invention utilizes computers, storage, and networks to achieve the goal of improved learning.

Improvement in literacy, both in reading and also in writing, is one of the world's most important educational objectives. A system of computers, storage, and networks has now been developed according to the present methods to support a literacy program that (a) utilizes books selected by students and provides professional development to teachers, (b) allows for implementation of a classroom, home, and/or after-school program, (c) provides for and manages safe correspondence between students and adult pen pals or mentors, and (d) allows a student's writing to be evaluated.

The methodology utilized by the literacy program is adaptive and dynamic, so that the system manages and records states and transitions that trigger specific actions tailored to each participant. It also manages the moderation and delivery of electronic and physical materials between participants. The participants in the program may have a variety of interdependent roles, for example student, teacher, pen pal, and parent.

The system enables parallel or non-parallel entry points for the various participants and processes those entry points to filter them according to validation and safety rules established for each user role. The validation and safety rules allow minors to participate in the learning program with approved, safe mentors who are generally of adult or older student ages.

Figure 2A:
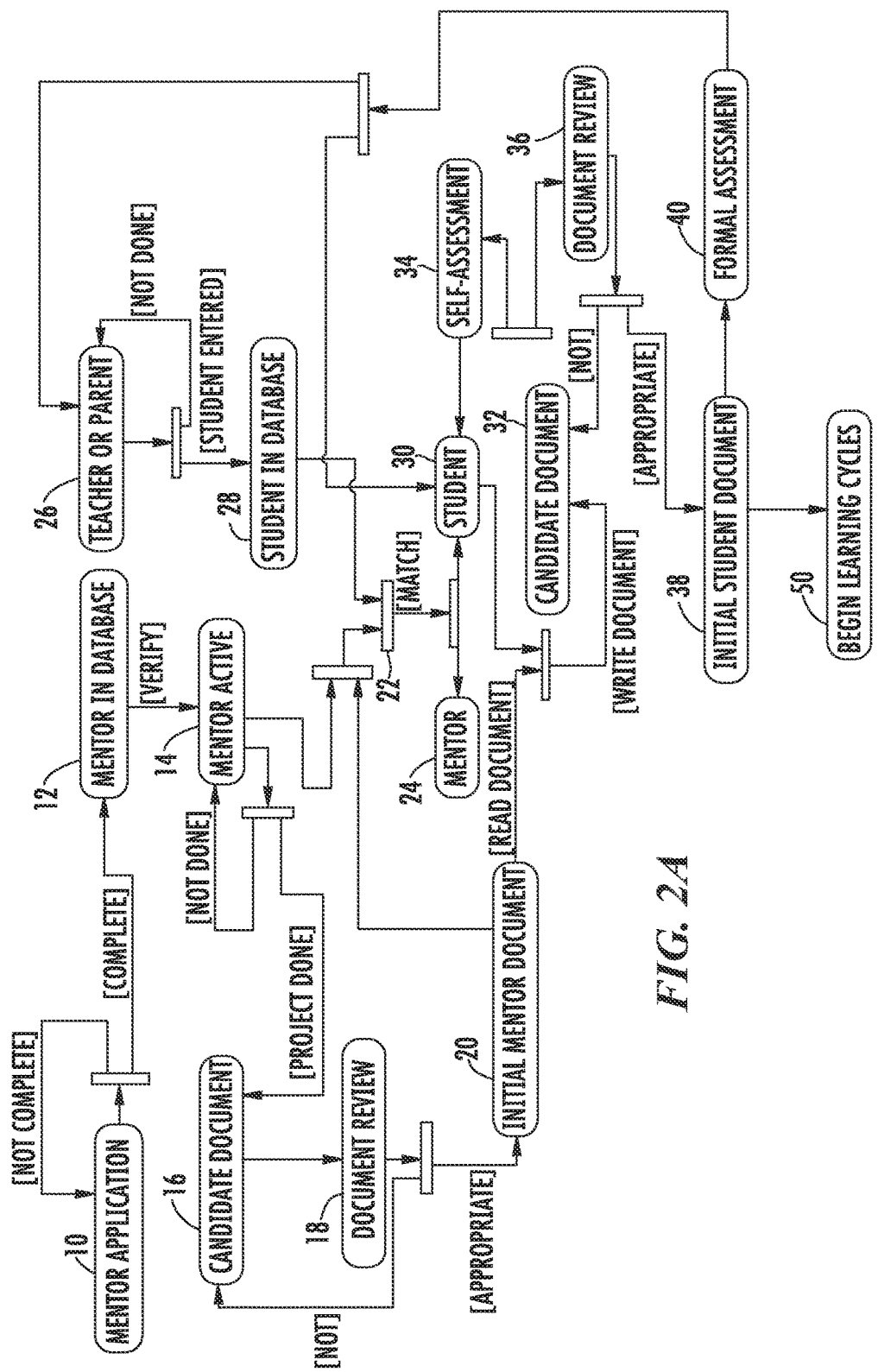
FIGS. 2A and 2B are flowcharts of a method of a system for developing literacy skills in accordance with an embodiment of the present invention.

Once validated, the participants enter a database, whereupon they are matched with a pen pal or mentor according to selectable, configurable criteria based on segmentation of populations best suited to match each participant. FIG. 2A shows the methodology of entering participants and the matching of students and mentors based on selectable criteria.

As shown in FIG. 2A, a mentor or a group of mentors enter the program by applying to participate at step 10. After the application is approved and the mentor is accepted, the mentor is then entered into a database at step 12. After verifying that the mentor is active at step 14, the mentor then participates in a project and creates a work indicative of the project at step 16. For example, the mentor may be asked to review an article, participate in a science project, or write an introductory letter applicable to a number of students, or may complete a project directed to specific subject matter on the other hand. Furthermore, the mentor may be asked to provide expert advice on a certain topic or review various materials, that originate from or that are provided to multiple students or to other participants in the process. Alternatively, the initial project may consist solely of creating an introductory letter that is provided to students upon their entrance to the learning network.

Once the mentor's project is completed, it is reviewed at step 18 for appropriateness. If the reviewer determines the project is not appropriate for any reason, the mentor may be asked to modify, revise, or recreate the project at step 16. The project is then reviewed again at step 18. This cycle may occur several times and, upon completion, the mentor's project is saved at step 20. As described in more detail below, students and mentors are matched at step 22. The matching of students and mentors may be based on various similarities between the student and the mentor or, on the other hand, may be based on similarities between the mentor's project, if it's directed to a specific subject matter, and the student's interest or requirements in that particular subject matter.

In another embodiment, the mentor is not required to complete a project prior to being matched with a student as described above with respect to steps 16, 18, and 20. Instead, the mentor and student may be matched based on criteria listed above other than an initial project created by the mentor. In yet another embodiment, once the student has been matched with a mentor, they may decide on an initial project to undertake.

In addition, the relationship in this method between student and mentor is not always one-to-one. For example, a student may have multiple mentors or multiple mentors may participate together or individually to mentor a single or multiple students. The relationships set forth herein should be understood to form a collaborative network that is not necessarily based on a one-to-one relationship.

At some point, the mentor becomes matched with at least one student. The student has generally been enrolled in the program by the student's parent or teacher at step 26, but situations could be provided whereby students could enroll themselves. Once entered, the student then is placed on the roster, saved in the database at step 28, and then matched with one or more mentors at step 22. The matching occurs through the use of a computer program that can match various aspects of students and mentors, including abilities, geographic locations, likes and dislikes, attributes, desires, comprehension level, etc. The matching of a mentor and student can also be based on subject matter. For example, if a student has an interest in a subject matter or is required to complete an assignment directed to that subject matter, he or she may be matched with a mentor who is knowledgeable about that subject matter or who has previously completed projects regarding the subject matter. The matching criteria can be selected by the operational programmer and can be based on any one or any set of unlimited criteria.

Once matched, the mentors (again sometimes referred to as "pen pals" because of the necessity for correspondence between the students and the mentors) and students move into an iterative cycle of reading or acquiring information, exploring related subject matter, and collaborating with similar participants in a social network who may provide expertise, are in the same phase of the learning process, or are interested in the same subjects. The student and mentor are introduced to each other through correspondence, which is generally always reviewed for appropriateness and which also may be self-assessed as many times as desired. In addition, the correspondence also goes to an assessor, who scores the quality of the correspondence for feedback to the student, teacher, pen pals, and parents. The cycle then repeats as often as is necessary or desired, perhaps using books, texts, or contents of different genres.

Specifically and still referring to FIG. 2A, the student reviews the initial mentor project, which was completed by his or her mentor and saved at step 20. The student then completes a responsive project, which could be a letter, poem, report, etc., at step 32. At this point, the student may decide to perform a self-assessment cycle at step 34 where he or she may critique the completed project. The student may then decide to modify, revise, or recreate the project at step 32. This cycle may occur a number of times. At any point, the student may submit the project to be reviewed at step 36. If the reviewer determines the student's project is not appropriate, the student is allowed to modify, revise, or recreate the project at step 32. The student again has the option of performing self-assessment on the revised project as described above. If the reviewer determines the project is appropriate, it is saved at step 38. A formal assessment of the projects is completed at step 40 and transmitted to the teacher or parent responsible for the student. The student then begins the learning cycle at step 50.

Figure 2B:
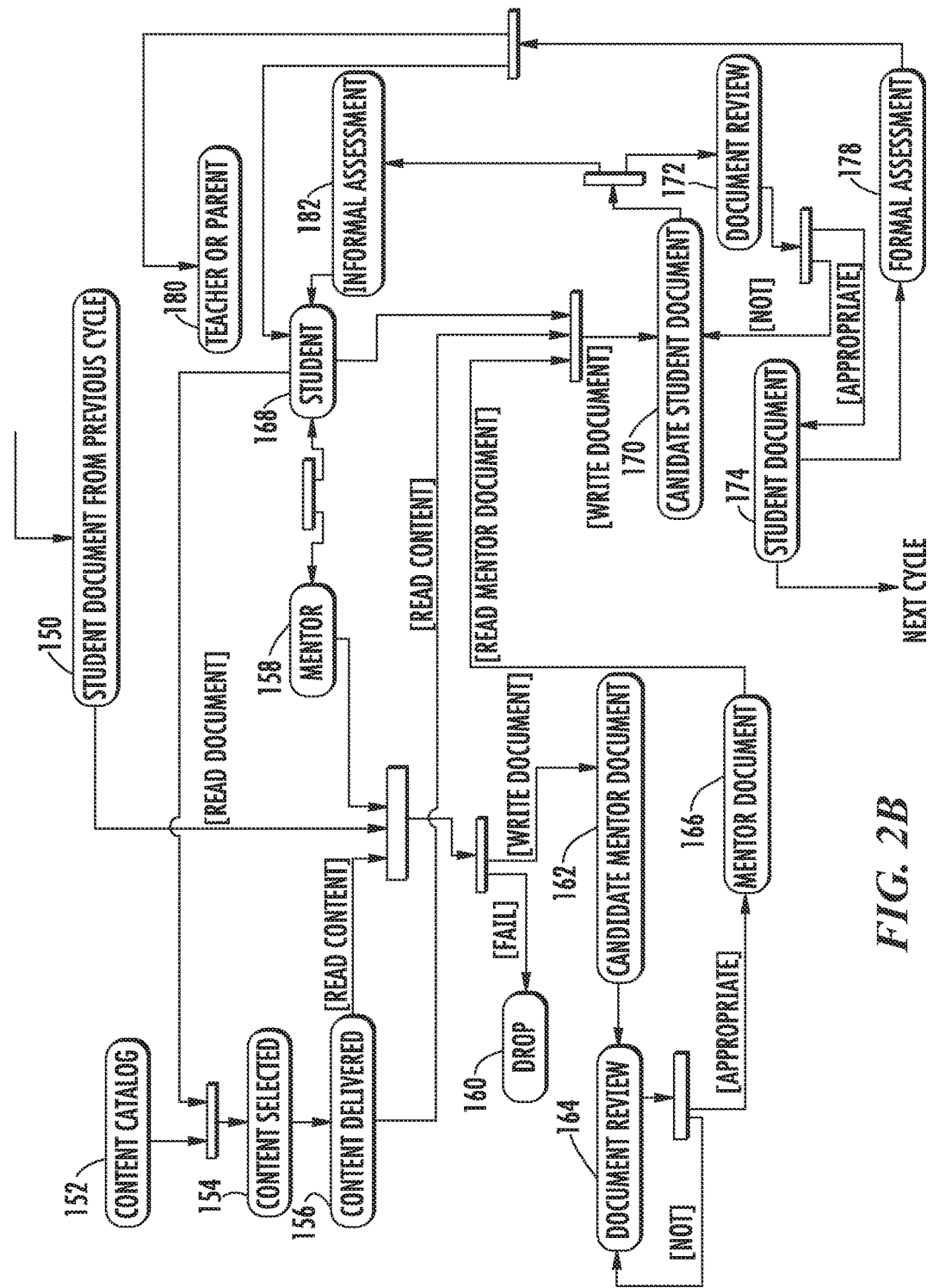

It should also be understood that the information or content being used can be books, projects, information from the news, text, artwork, or any range of multimedia. The information can be directed to a number of subjects, such as technology, science, social sciences, current events, literature, etc. The only requirement for the information is that it be reviewable and learnable by the student and mentor so that they can correspond about the subject matter of the information. Referring to FIG. 2B, a content catalog 152 contains the information used in the learning cycle, which the student reviews and analyzes in order to select subject matter in which he or she is interested at step 154. The relevant content is delivered at step 156 and is reviewed and analyzed by both the mentor and the student. The student has the option of dropping out of the process at step 160. Otherwise, the writing application guides participants through a writing process that stimulates critical thinking, which is reflected in their writing. The writing is then assessed. This process is described in more detail below.

After reading the information, extending knowledge, and collaborating, mentors submit written correspondence to the students created with a process-oriented writing application at step 162. Correspondence from the mentor is transmitted to a moderator at step 164, who is either a teacher or another entity that reviews the correspondence for appropriateness and safety. The moderator releases it to the student, modifies it, returns it to the originator for revision, or rejects it. When the moderator determines the mentor's correspondence is appropriate, the correspondence is saved at step 166.

Once the student receives the correspondence, the student goes through the same process to generate return correspondence, which also goes to the moderator for checking before being released to the pen pal/mentor. The system thus enables personalization, but preserves anonymity through the correspondence process's safety checks and balances.

This process of correspondence is also set forth in FIG. 2B wherein a student writing (which is not limited but which could include writings, composed music, project reports, newspaper articles, and anything that could be created by the student) is first created at step 170. The student-created writing is self-assessed as many times as the student desires at step 182, but then is ultimately passed through a formal review at step 172. If the reviewer determines the writing is inappropriate, it is returned to the student at step 170 to be modified, revised, or rewritten. If the reviewer determines the writing is appropriate it is saved at step 174. A formal assessment provides the teacher and/or parent with progress results at step 178. This entire cycle may be repeated to enhance and increase the learning associated with a singular work or with multiple works. If the cycle is repeated, the student at step 168 selects more content at step 154, and the process begins again.

Unique tools and processes are managed by this system to stimulate critical thinking, iteration, and the publication of writing for consumption by members of the social network. The system records each action, or monitors the absence of action, and manages transactions accordingly or enables the triggering of transactions based on specified business rules. The tracking of the status of each participant is used to personalize their context so they know their position as they iterate through a cyclic learning process on different subjects. The system also shares this status with other participants who are related in some manner. This status is also used to personalize tools and the interface corresponding to the participant. For example, because the system "knows" that a student is currently writing about a certain subject, the writing process is tailored to the student's level, subject matter, genre of writing (e.g., poem, letter, science report), and phase of the writing process (e.g., plan, draft, revise, edit, and/or publish).

The system provides a variety of loosely coupled tools that are integrated based on the attributes of the participant and which may be used in a self-directed manner by either the student or the mentor. These unique tools include:

1. Portfolio—organizes drafts, documents, messages, notes, references, etc. Accessibility to read and write to the portfolio is integrated into the writing process.

2. Writing—an application that guides writers through a process that includes the following steps: plan, draft, revise, edit, publish, and/or send. The writing center is context-sensitive and is dynamically tailored based upon the attributes of the writer, including grade level, reading level, the number of cycles completed, genre of writing, subject matter, and preferences.

3. Assessment—a writer may request feedback on their writing at any stage during the writing process including post publication. The text is assessed based on a rubric that measures mastery of reading comprehension, writing, and critical thinking skills within the context of a genre of writing, written dialogue between two or more participants, and subject matter content.

4. Find content—a fundamental aspect of the literacy learning process is to find and select content that two or more related participants both read and discuss. This tool helps participants find content of interest, keep track thereof, and communicate interest in them to others (e.g., student finds a book they like and the system notifies the pen pal or parent). The "find content" or "find text" tool coordinates the selection process between related participants and provides an interface for purchasing if applicable. Upon purchase, the system sends the content to all related participants that read and engage in online collaborative discussion(s) about the content.

5. Discovery—another integral part of the learning process is to extend and integrate new knowledge. Discovery guides participants through multimedia content that is related to the subject matter of the content they are reading. Moreover, discovery provides methods to access concentrations of content that are tailored to multiple learning styles (e.g., audio, text, interactive, etc.).

6. Learning Community—the learning process takes place within a community whose members have been verified and validated. Collaborative tools for social networking are used in a self-directed manner to make connections between people (e.g., teacher, expert). Participants may publish items to a personal blog, connect blogs using RSS feeds, send invitations to make connections at the users' discretion, and share social bookmarking. The network provides a platform for increasing comprehension and critical thinking through discussion and interaction. This aspect of the overall process further integrates with the learning process by providing an authentic audience and real-life purpose for self-expression and publishing.

Similarly to academic scholars, participants use this collection of process-based learning tools to discover, collaborate, critique, communicate, and stand on the shoulders of others to collectively create a network for learning. Together these tools provide a state-related and user-role-specific seamless experience for selecting content and exploring related multimedia content, as well as a writing center that integrates other subject-related resources (e.g., vocabulary, themes). The system provides an integrated process for producing creative documents that synthesizes reading, writing, and critical thinking in a collaborative network.

Figure 3A:
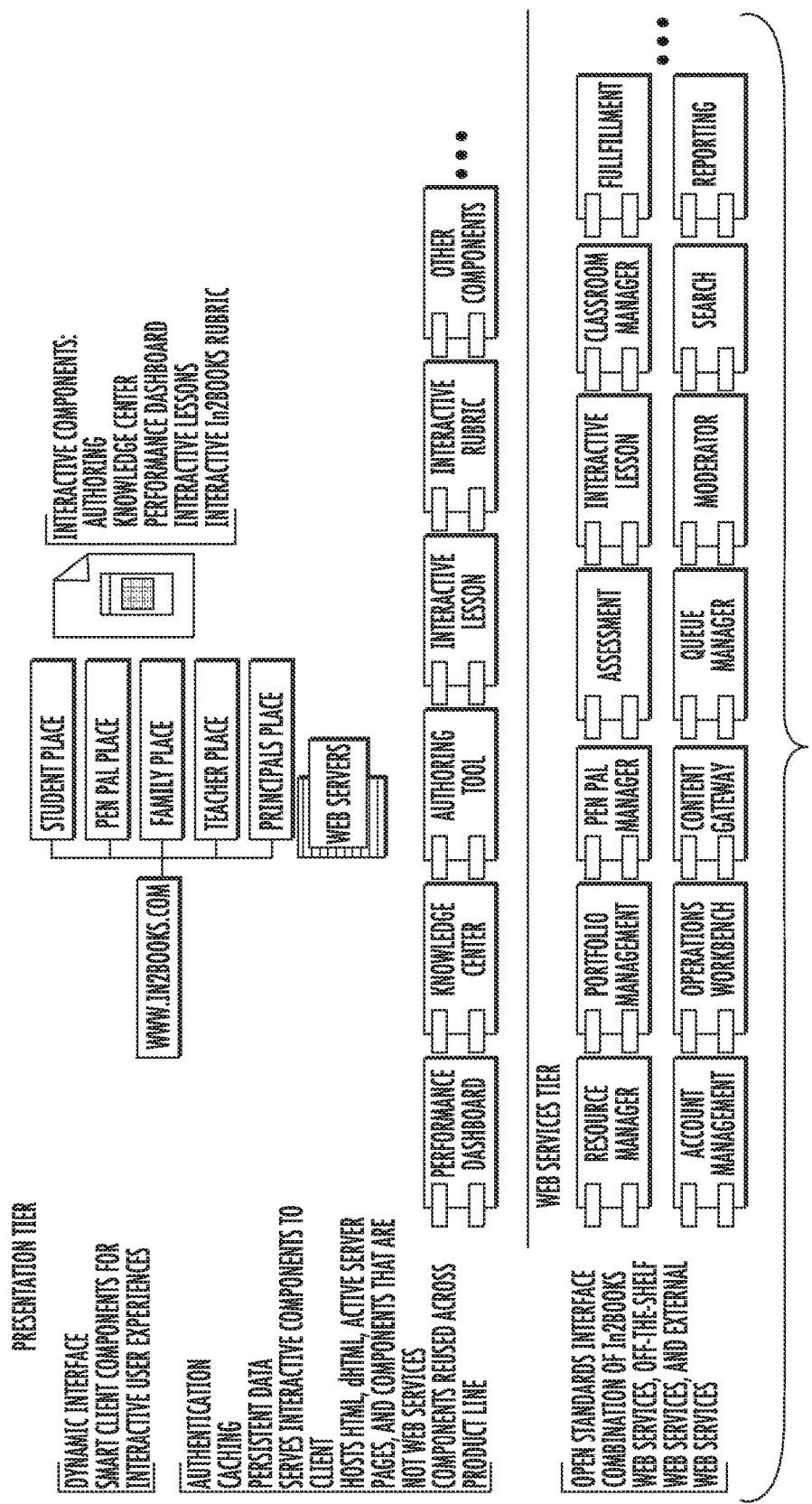
FIGS. 3 and 4 are hierarchal representations of a learning system for developing literacy skills in accordance with an embodiment of the present invention.
Figure 3B:
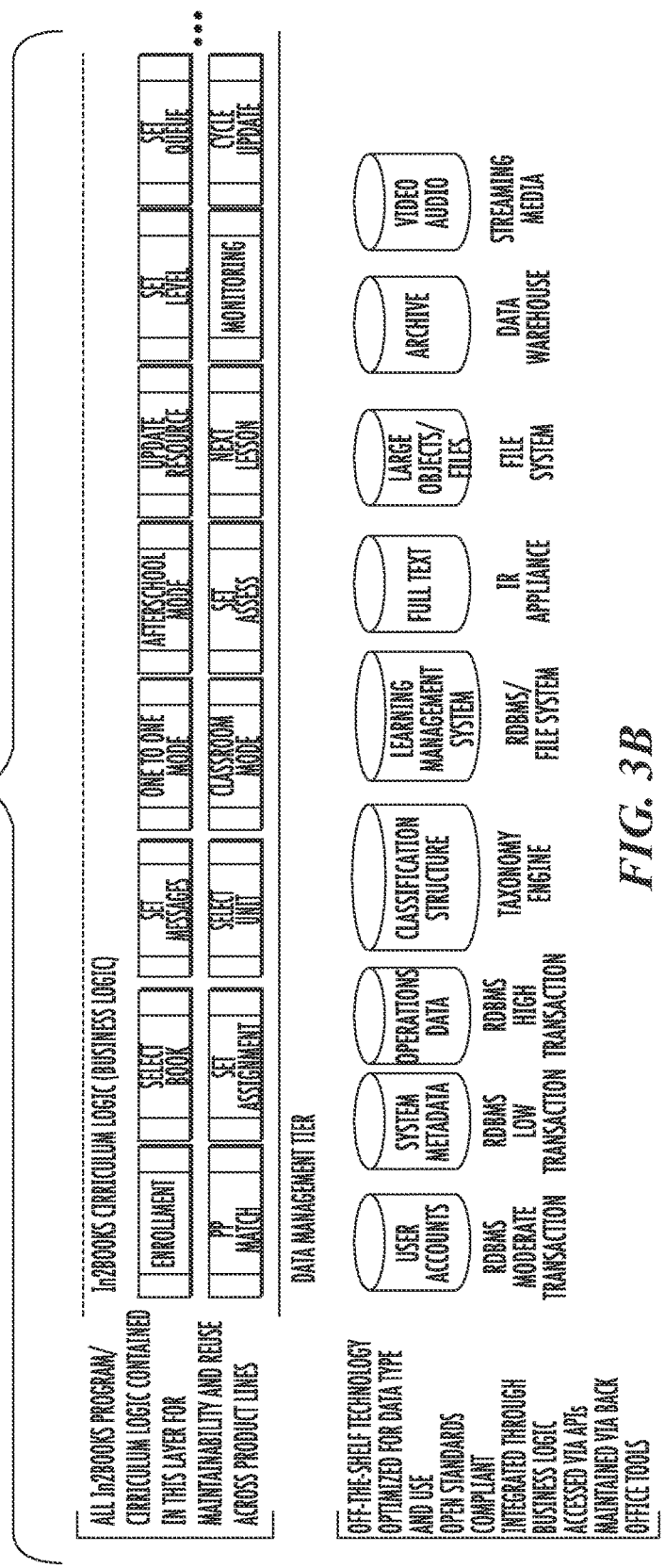
Figure 4:
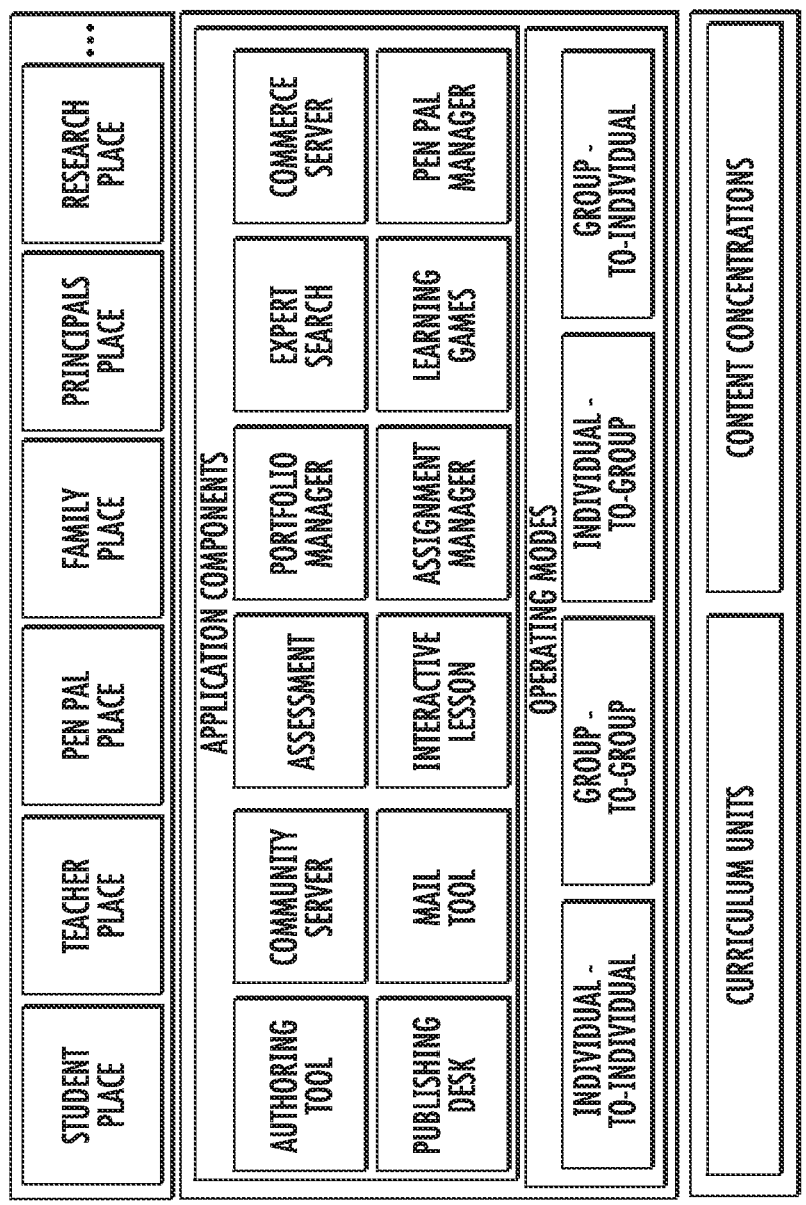

The learning system and process described above can be implemented using various technologies, including wide area networks, web servers, and logical systems. Hierarchal representations of one embodiment of a learning system implemented to make use of such technologies are set forth in FIGS. 3 and 4. Additionally, the learning process described above can be performed online or over a network. FIGS. 5 through 16 illustrate an embodiment where a graphical user interface allows a student to participate in the learning cycle and provides access to the tools described above.

Figure 5:
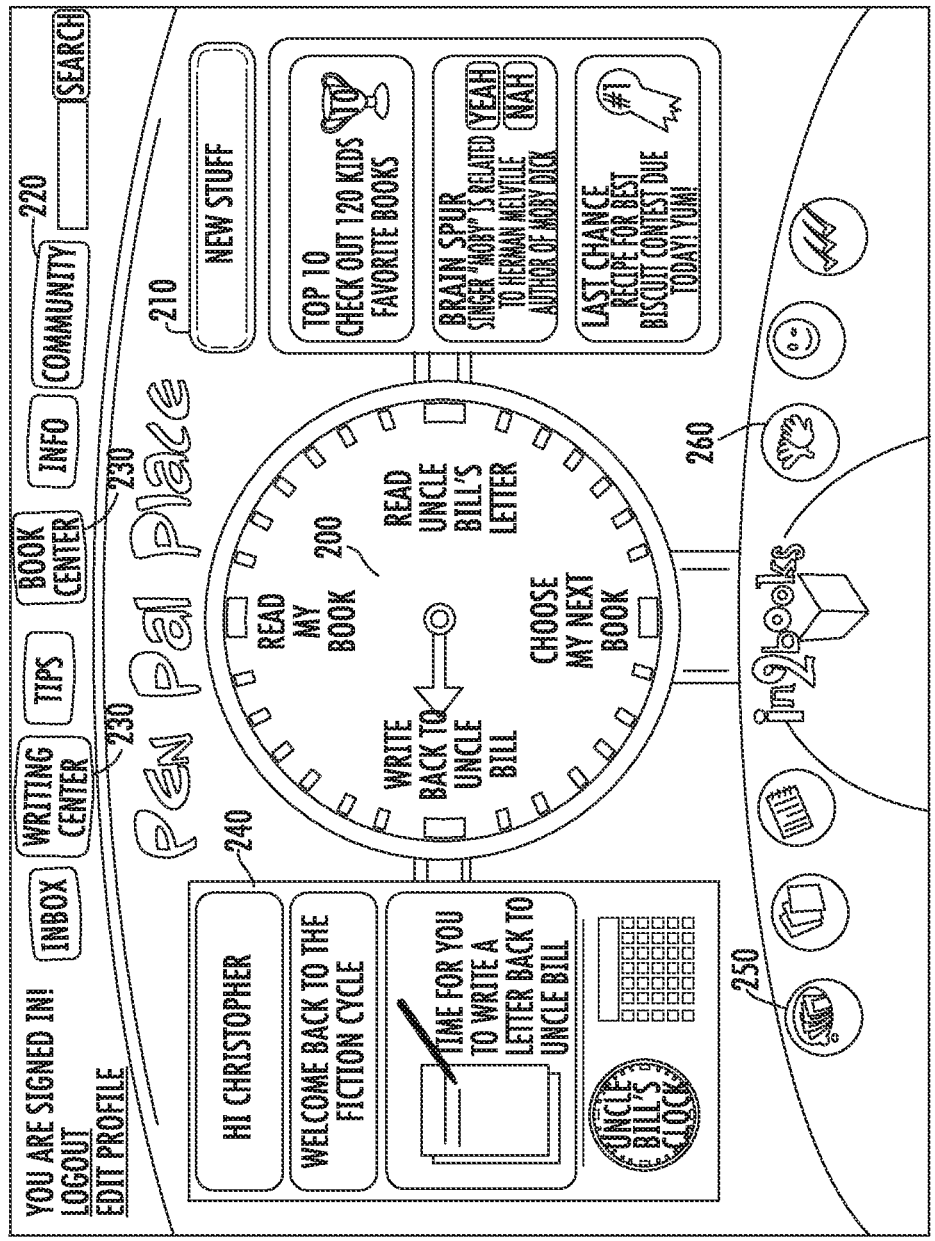
Figure 6:
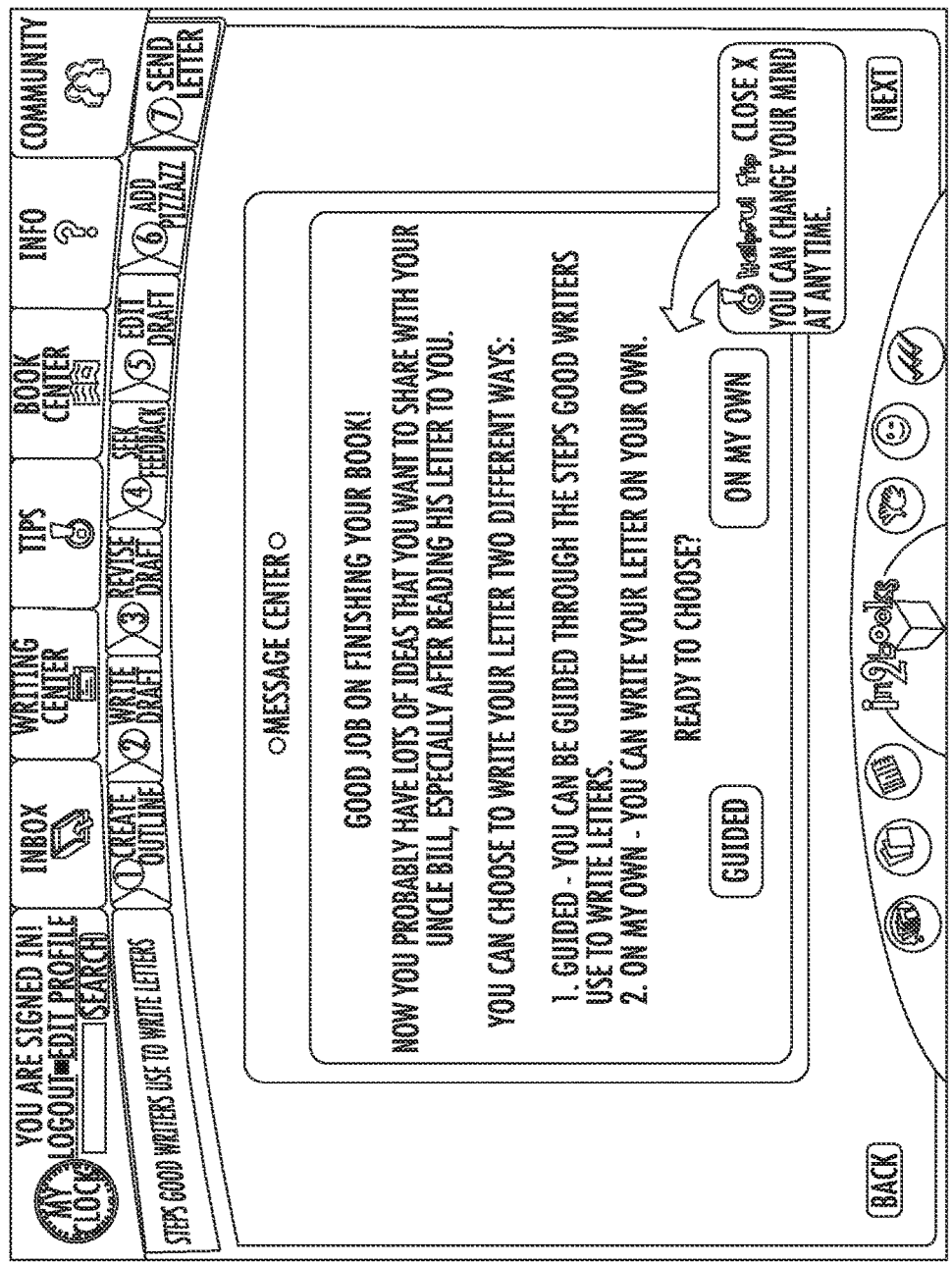
Figure 7:
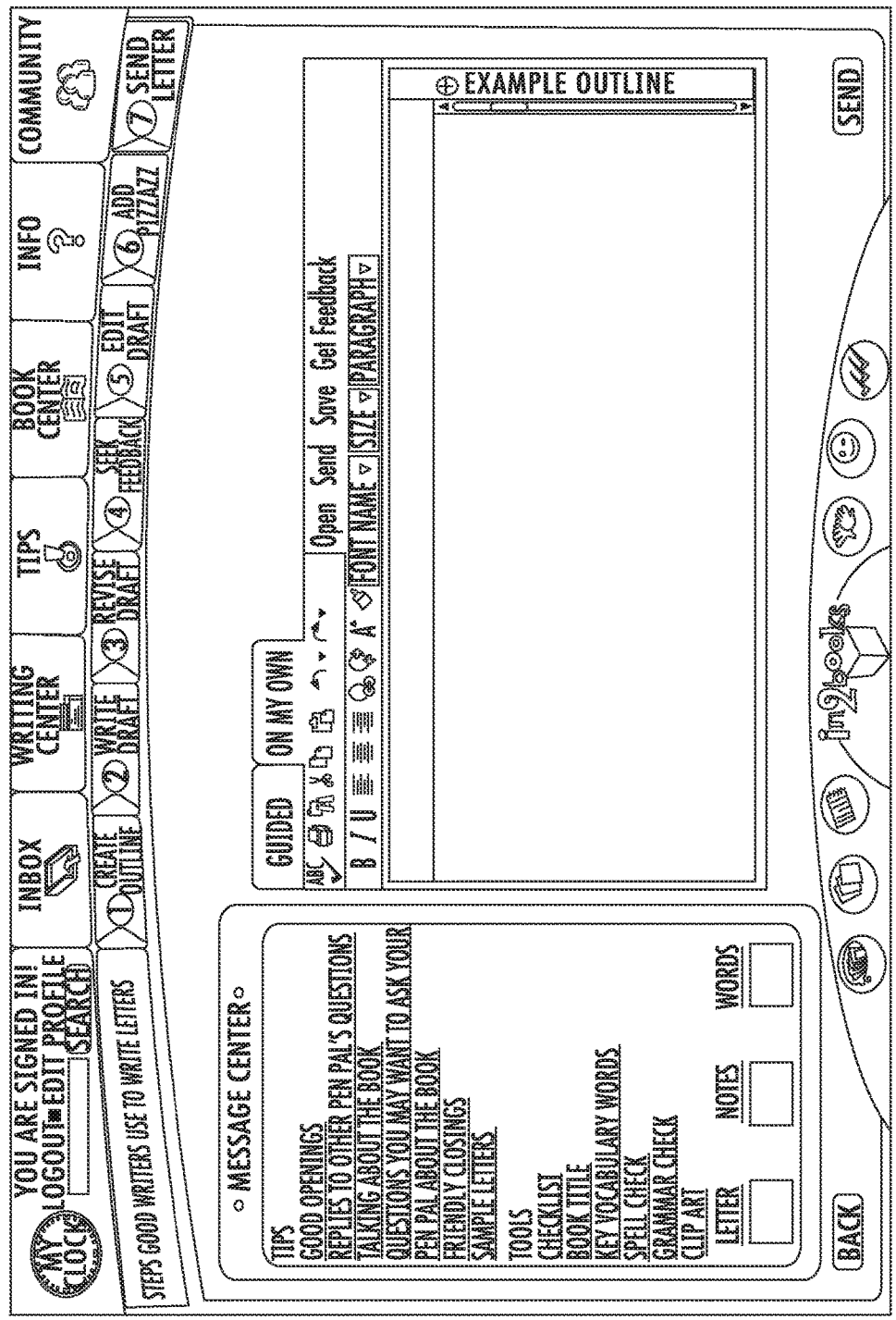
Figure 8:
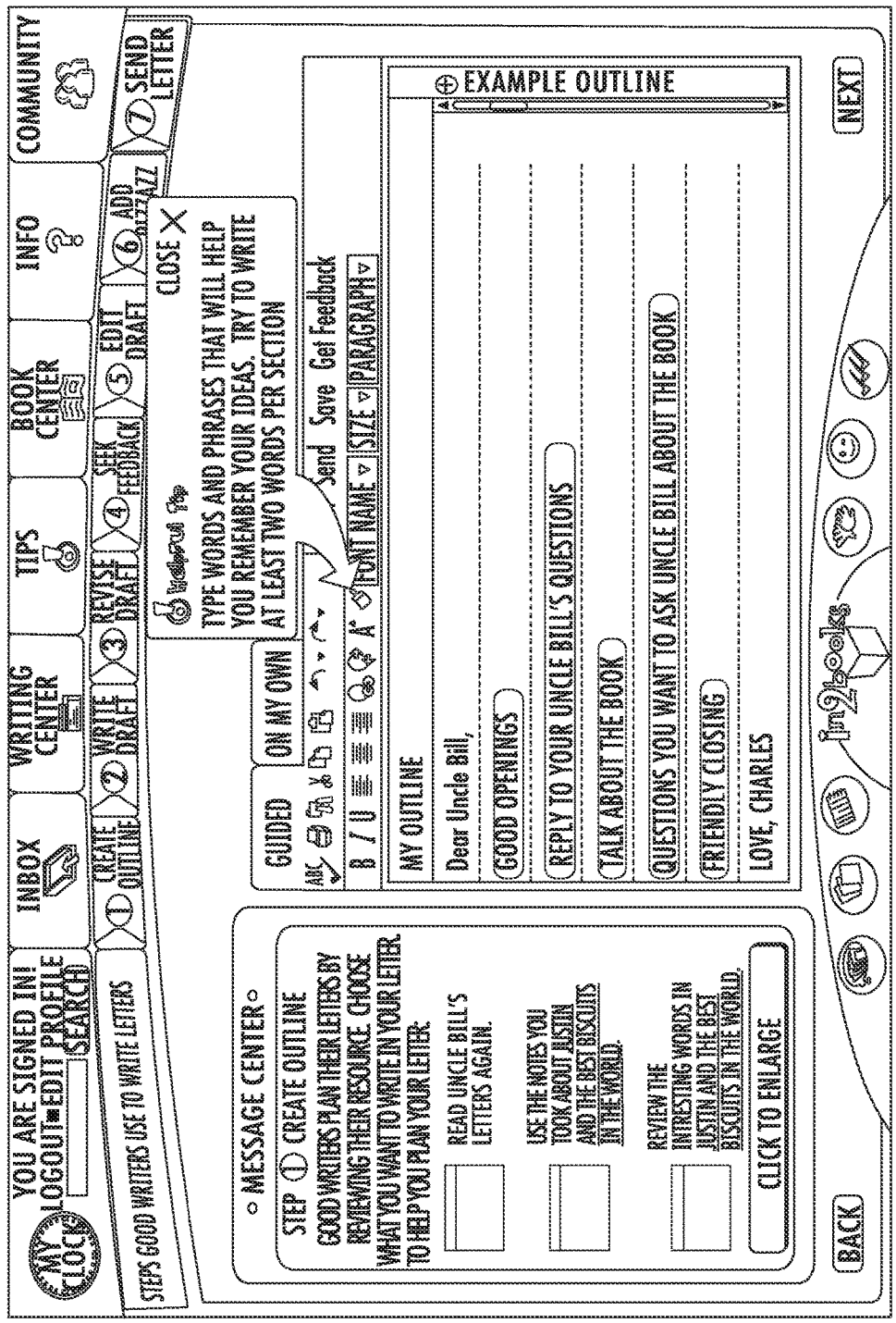
Figure 10:
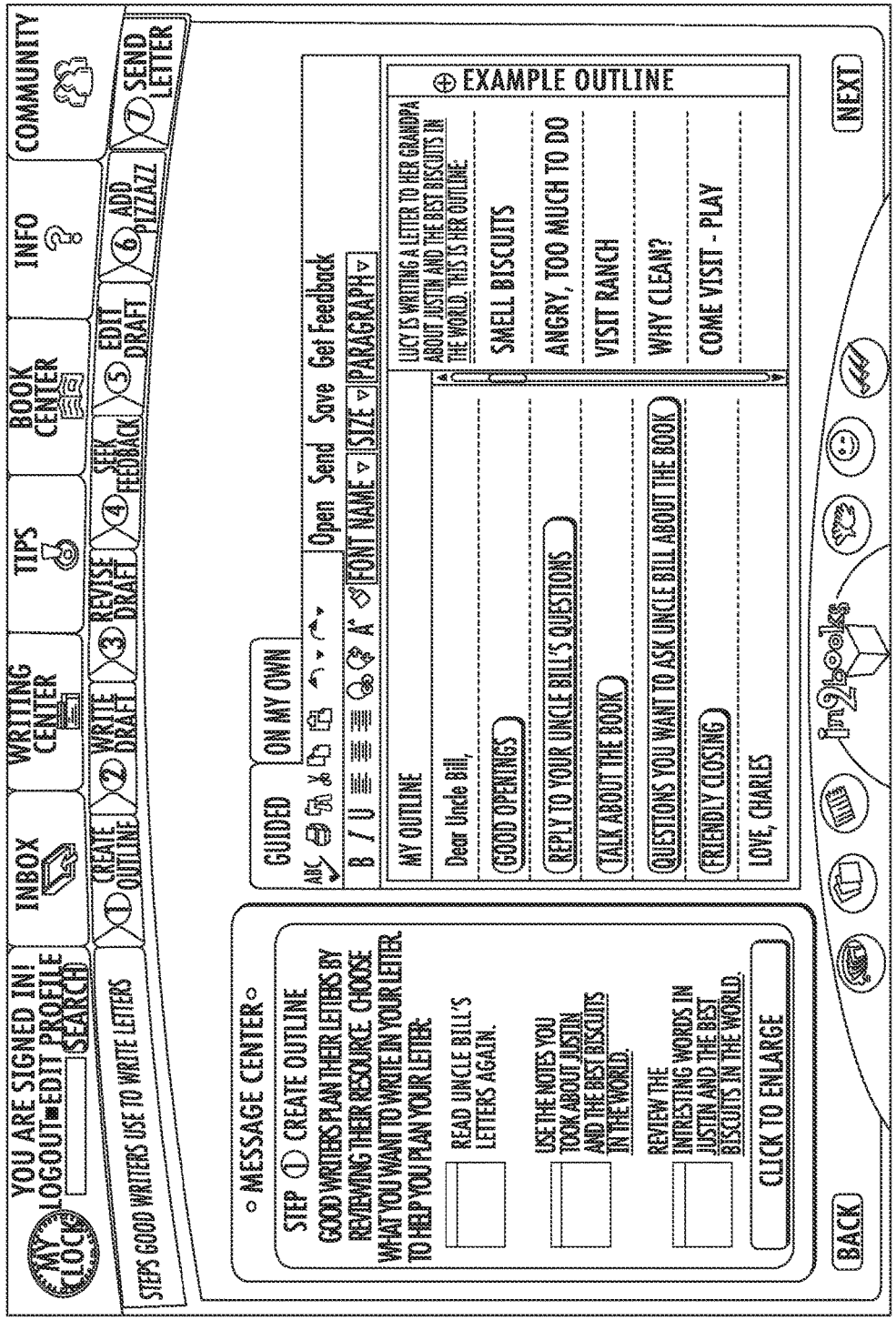
Figure 12:
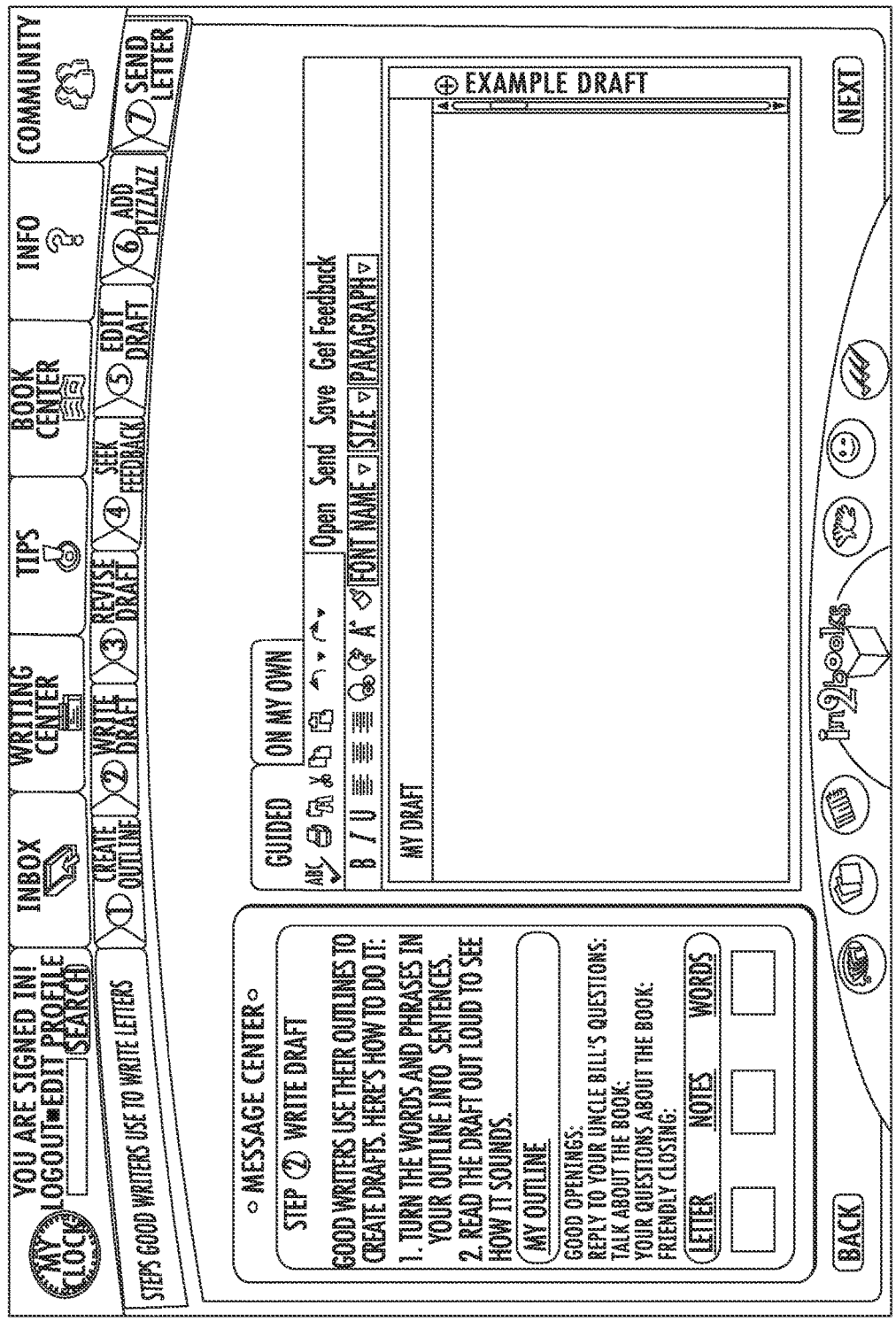
Figure 15:
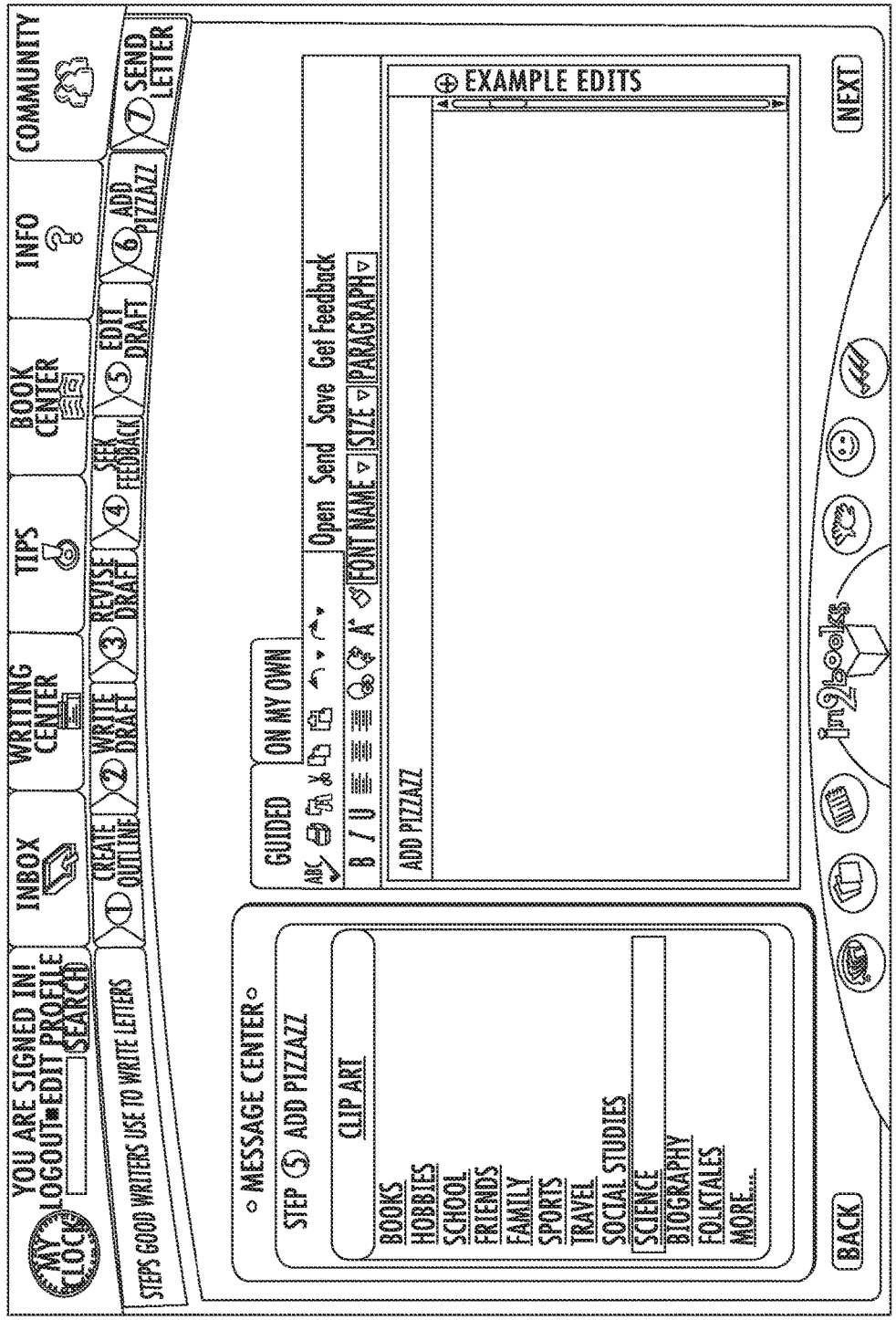
Figure 16:
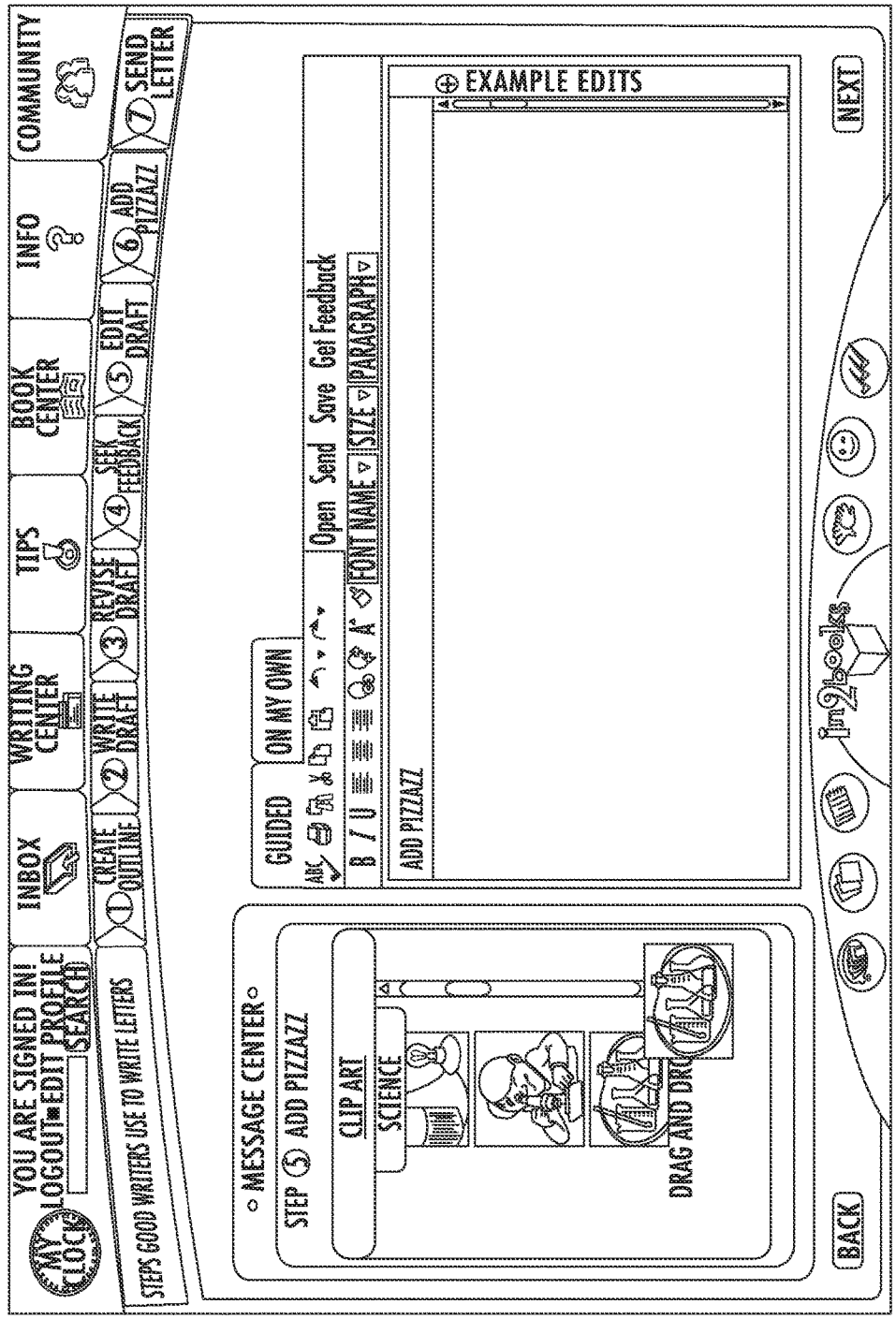

FIG. 5 exemplifies a main interface available to a student to participate in the learning network system. A main clock 200 indicates to the student the next step in the learning system process. A section 210 on the interface supplies the student with other content of interest to the student. A button 220 provides the student with access to a learning community in order to take advantage of the tools described above. A writing center button 230 provides the student with access to the writing center tools described above that provide assistance to the student in writing correspondence as shown in ensuing FIGS. 6 through 16. A section 240 identifies the student and provides the student with information specific to the student. A blog button 250 provides the student with access to "blogs" that allow the student to contribute, collaborate, and/or receive creative ideas about the learning process or the subject matter reviewed by the student. A friends button 260 allows the student to keep track of friends acquired while proceeding through the learning process. Once the student has completed the learning process with respect to one book or one project, he or she may choose another project through the use of a book center button 270. The student uses main clock 200 to keep track of his or her progress and to proceed to the next step. FIGS. 6 through 16 exemplify an interface used by the student to participate in the learning cycle once the student has completed reading or analyzing the current project. The student is guided through the creative writing process using this interface.

EXAMPLE

While the present inventive method can be used in various environments, one particular environment where it is particularly effective is in the context of a program that promotes the reading of books and the writing of correspondence regarding the subject matter of such books between students and their mentor pen pals. The operating procedures for one such learning program is described herein as an example in which the present systems and methods can be utilized. As used herein, the term "program operator" refers to an actual person or to a computer program that, through the use of predefined software, can carry out the functions of the program operator. In addition, it should be understood that some of the functions may be carried out by a real person and others may be computer-driven.

Figure 17A:
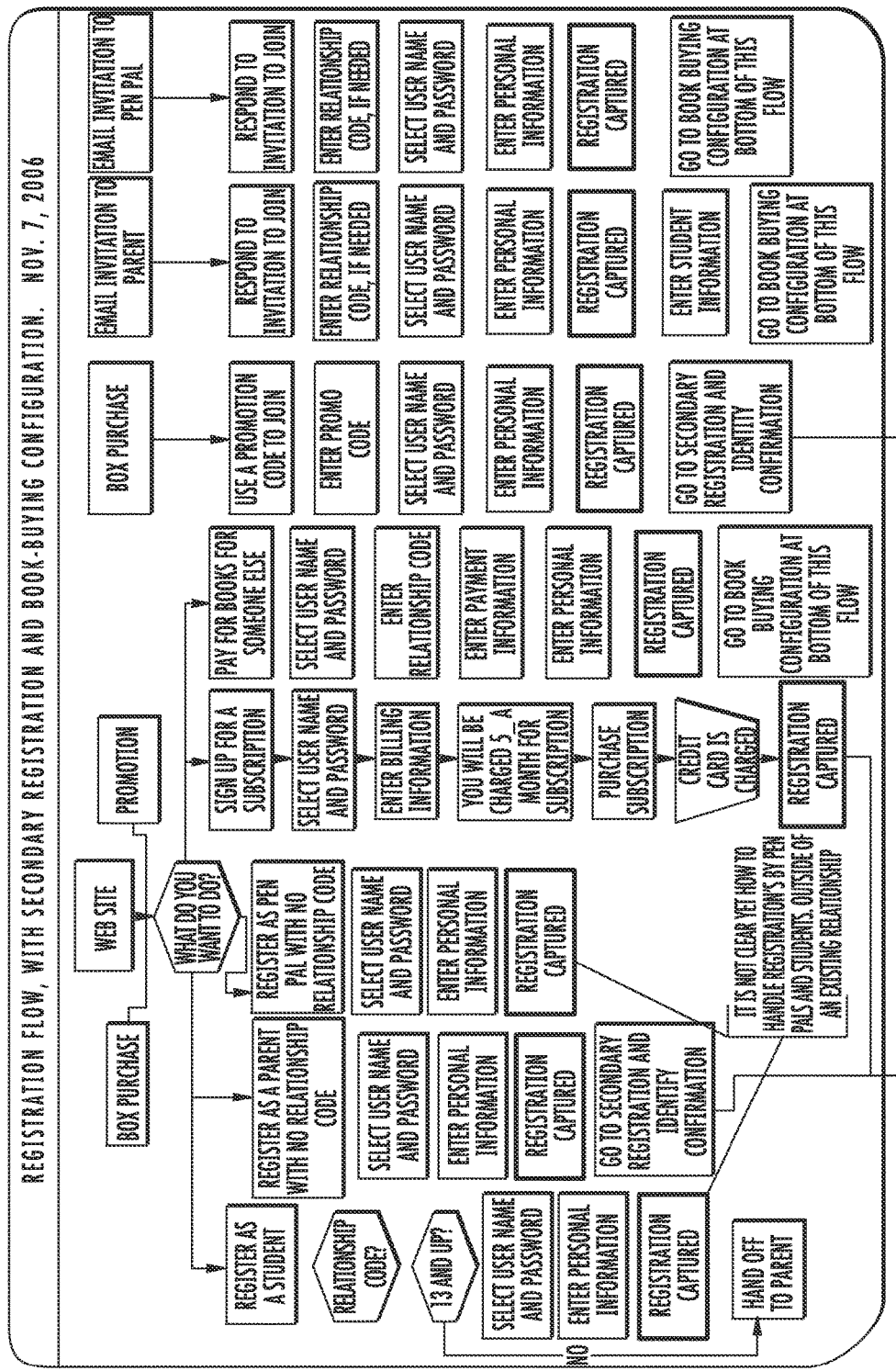
Figure 17C:
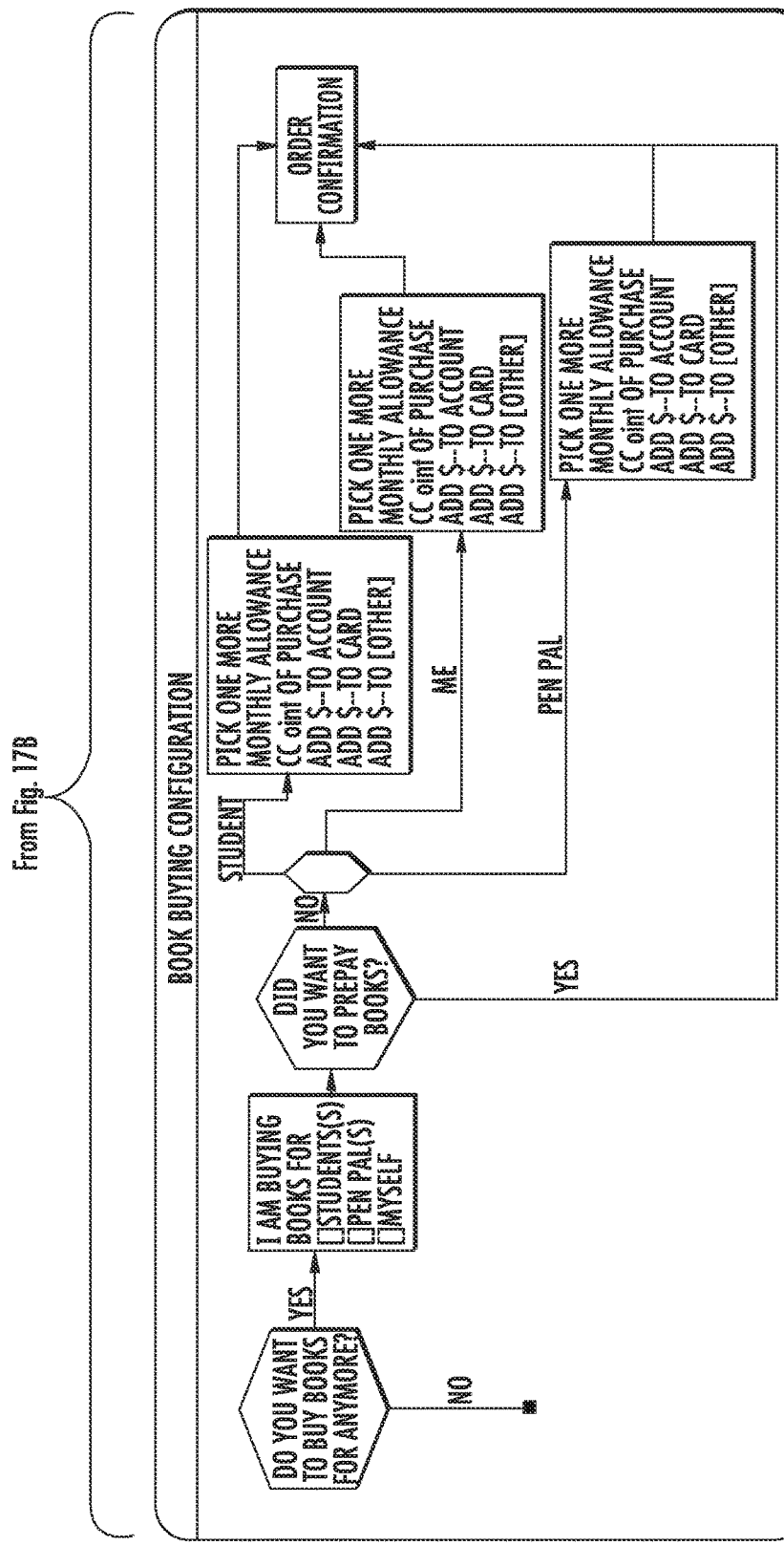

The overall process operates as follows. In general, the registration process for students and pen pals is shown graphically in the flowchart in FIGS. 17 A, B, and C. The flowchart additionally shows the process for purchasing books in the "Book Buying Configuration" portion.

First, as a prerequisite to receiving a matched student, the pen pal uploads an introductory letter to the "Workbench," which is a part of the system that administers the method of the present invention. The pen pal is then is matched to a student and the pen pal's introductory letter is uploaded to the mailbox of the matched student's teacher. Workbench alerts the teacher that the pen pal letter is available and the teacher reviews, edits if necessary, and releases the pen pal introduction letter to the matched student.

The teacher's release of the pen pal letter to the student triggers the Workbench to generate auto message alerts of new mail to the student and the next Genre (for example, fiction) for Book Selection Availability to teacher/student.

The student makes the first genre book selection and sends the choice to the teacher inbox. The teacher accepts/rejects and/or overrides the student book selection and uploads the information to the Workbench. The Workbench pushes a Book Selection Manifest by classroom to the Fulfillment Center.

Figure 18A:
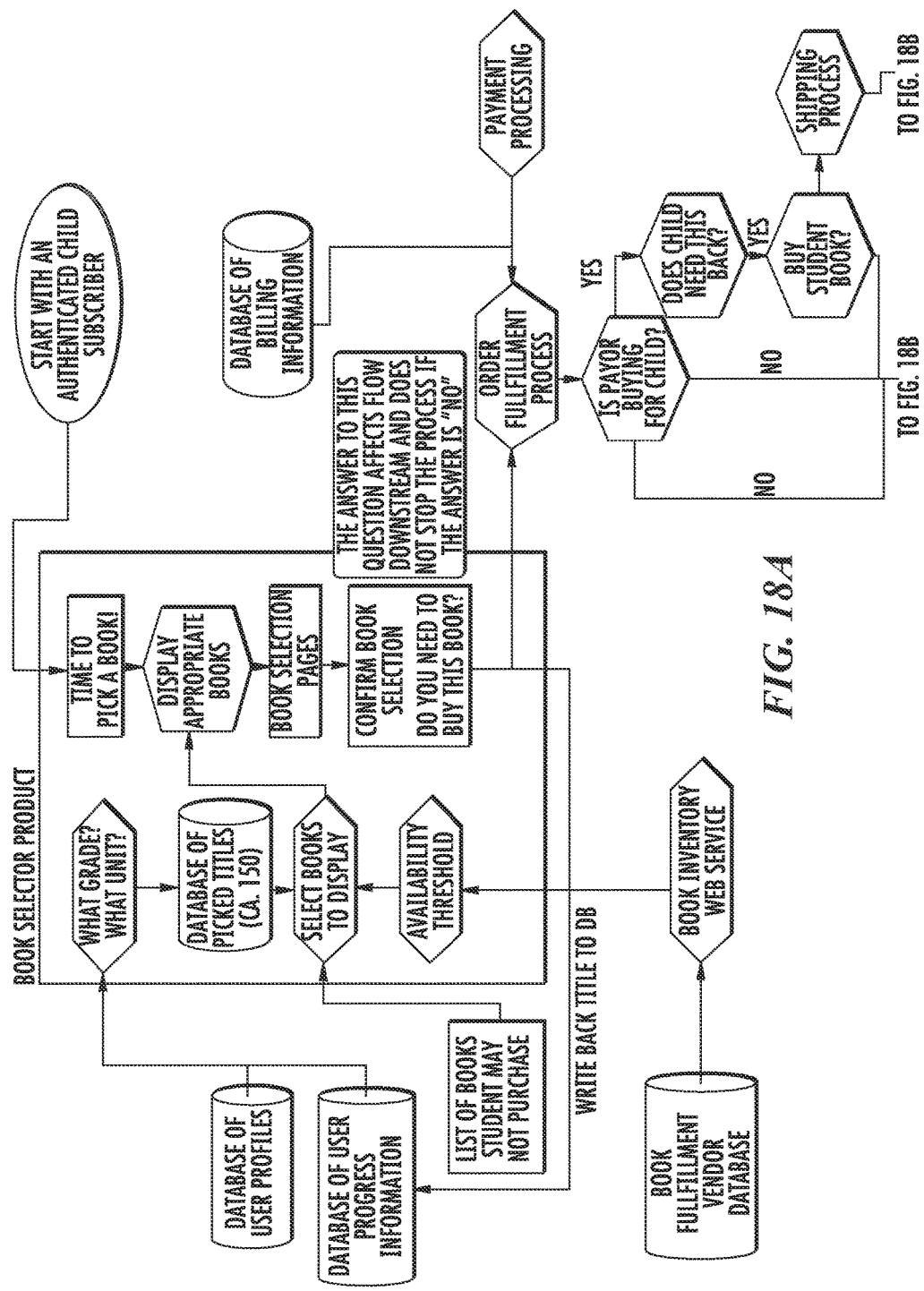
FIGS. 18A and 18B illustrate a flowchart showing the steps of the book fulfillment work flow.
Figure 18B:
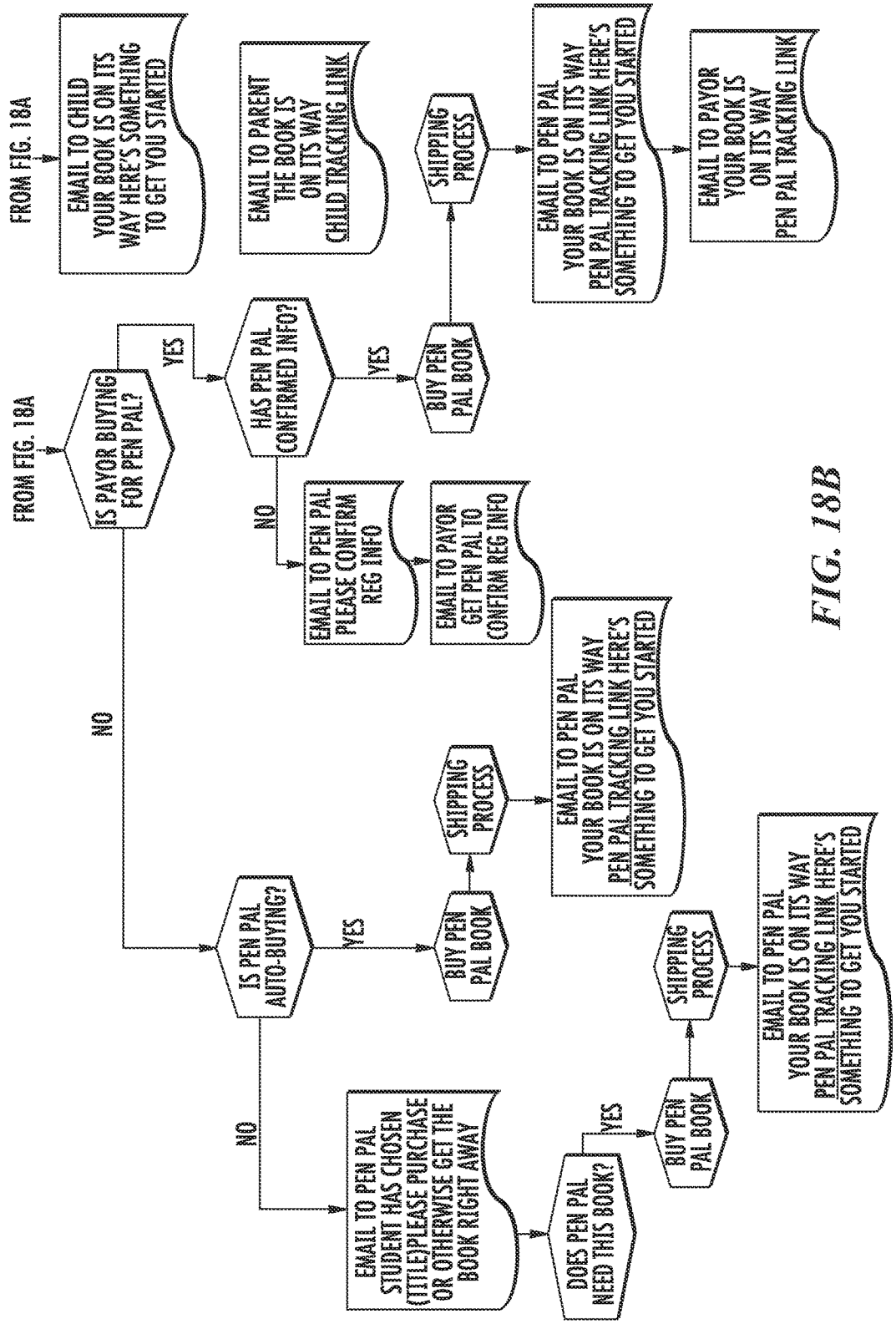

The book ordering process is shown graphically in the flowchart in FIGS. 18 A and B. As shown therein, after the book is selected and ordered, the Fulfillment Center creates the packing slip and ships the chosen genre book(s) to the pen pal according to pre-chosen methods.

The Workbench alerts the pen pal of the new genre book assignment from student.

The student composes their introduction letter (draft and final) and sends to the teacher's inbox not later than fourteen (14) days after receipt of the pen pal intro letter. The teacher reviews, comments, and releases the student introduction letter to the pen pal mailbox to close out the cycle. The teacher's closing of the cycle actually triggers the program operator to request the Fulfillment Center to ship the genre book to the student. The Workbench generates a new mail alert to the pen pal announcing the arrival of the student's intro letter, and the Fulfillment Center creates the packing slip and ships the books to the classroom according to the method specified. The Fulfillment Center pushes shipment/delivery confirmation manifests with invoices to the Workbench quarterly.

The pen pal receives and reads the initial genre book that has been chosen. The pen pal reads the student introduction letter and then composes a genre letter and uploads it via the Pen Pal Place to the teacher's mailbox not later than fourteen (14) days after receipt of the student introduction letter. The Workbench generates auto message alerts of new mail to the teacher with the arrival of each pen pal letter until all pen pal letters have been submitted.

The teacher reviews, edits if necessary, and releases the pen pal letters to students. The teacher's release of pen pal letters to students triggers the Workbench to generate an auto message alert of new mail to students and the Genre Book Selection Availability to teacher/student.

Each student makes the next genre related book selection and sends to the teacher's inbox. The teacher accepts/rejects and/or overrides the student's book selection and uploads that to the Workbench. The Workbench pushes the Book Selection Manifest by classroom to the Fulfillment Center, which creates the packing slip and ships the next genre books to the pen pals according to the method specified.

The Workbench alerts each pen pal that (s)he has a new genre book assignment from a student. The Student composes a genre letter (draft and final) and sends to the teacher's inbox not later than fourteen (14) days after receipt of the pen pal's letter on the first genre book.

Ultimately, after completion of one or more cycles of reading and writing with respect to a particular genre, the teacher may review, comment, and release all student letters to pen pal mailboxes to close out a particular genre of books. The teacher's closing of the genre triggers a program request to the Fulfillment Center to ship the next genre books to students according to the method specified. The Workbench generates a new mail alert to each pen pal announcing the arrival of the student's (genre) letter. The Fulfillment Center creates the packing slip and ships the books to the classroom according to the method specified. Again, the Fulfillment Center pushes shipment/delivery confirmation manifests with invoices to the Workbench quarterly.

As can be seen, the release of pen pal letters to students by the teacher triggers the Workbench to generate and post an auto message of the Book Selection Availability to Teacher and Student Places. The students may choose a book title and forward it to their teacher's inbox. Teachers accept/reject and/or override the selections made by the student before saving/uploading the completed order to the Workbench through Teacher Place. Upon receipt of the teacher's book selections, the Workbench generates an auto message of "THANKS" to the teacher verifying/confirming receipt of the selections. The Workbench also generates an auto message to the pen pals announcing the new book selection title en route from the student. The Workbench pushes the Book Selection Manifest by classroom to the Fulfillment Center for shipping to the pen pals. The Fulfillment Center creates the packing slip and ships the books to the pen pal according to the method specified. The Fulfillment Center pushes shipment/delivery confirmation manifests with invoice to the Workbench quarterly.

Student books are shipped only after teachers release student letters to pen pals signaling the close of the genre. The Workbench pushes the classroom Book Selection Manifest to the Fulfillment Center for shipping to students. The Fulfillment Center creates the packing slip and ships the books to the classroom according to the method specified. The Fulfillment Center pushes shipment/delivery confirmation manifests with invoice to the Workbench quarterly.

Teachers can make and upload Book Selections to the Workbench as early as one day following receipt of the Book Selection Availability auto message or as late as the current genre student letters due date. However, the selections must be made not later than this due date so as to provide enough time for pen pal shipments. If book selections are not made by this date, the Workbench generates an auto message that book selections due (on a specific day) are tardy and that the students will receive the default book title for his/her grade level and genre. The message also reiterates that selected book titles are on a first-come, first-serve basis and may not be changed for any reason.

The Workbench generates an auto message to the teacher confirming the default book selection title and an auto message to pen pals announcing a new book selection en route from the student. The Workbench pushes the Book Selection Manifest by classroom to the Fulfillment Center for shipping to pen pals. The Fulfillment Center creates the packing slip and ships the books to the pen pal according to the method specified. The Fulfillment Center pushes shipment/delivery confirmation manifests with invoice to the Workbench quarterly.

All student and pen pal letters uploaded to the Workbench are filtered initially through screening software before they are deposited into the individual Teachers Letter Processing Queue for a more detailed content and security screening of identifiable and questionable/inappropriate information. Teachers delete identifiable information (surnames, school names, date of birth, addresses) on student and pen pal letters before uploading to the pen pals/students. Teachers/pen pals upload to a Workbench Help Desk any letters containing content deemed questionable or inappropriate they wish to escalate for appropriate action. The Workbench generates an auto message of "THANKS" to the teacher and/or pen pal for reporting an issue with an estimated resolution of 36 to 48 hours or less. Staff contact affected participants and determine an amicable solution.

A teacher may compose and send standard email messages to his/her student(s) and students' pen pals and other program participating teachers through the Writing and Message Centers using prepopulated email addresses. Teachers may also develop moderated discussion (questions) forums on appropriate, grade-specific subject matter/topics for his/her classroom students.

Pen pals may compose and send standard email messages to his/her student through the student's teacher and other pen pals via Pen Pal Place Writing and Message Centers using prepopulated email addresses. Students may compose and send standard email messages to his/her teacher and pen pal through the Writing and Message Centers using prepopulated email addresses. Students may participate in moderated discussions with his/her classmates through the Moderated Discussion Forums developed by the teacher. Teachers moderate the discussion. Teachers, students, and pen pals may escalate or report messages deemed inappropriate. The program operator may monitor and/or edit any messages.

Teachers, pen pals, and students may request program assistance from or report inappropriate use at any time by visiting the Teacher Place, Student Place, or Pen Pal Place and selecting "HELP."

The student portion of the system is administered as follows. First, teachers review the program overview and rules of conduct with new students, and then download and distribute a Children's Online Privacy Protection Act ("COPPA") Consent Form for student and parental signage. Teachers log on to the Workbench through the Teacher Place to enter the class roster of student(s) with each student's name, ID, grade, and gender.

The Workbench generates student login usernames and passwords immediately following the teacher's data entry of student. Teachers distribute the students' usernames/passwords at his/her convenience. The Workbench generates an auto message to the teacher "welcoming his/her class," confirming receipt of the class roster, and informing his/her student(s) that (s)he is generating pen pal assignments for the student(s).

Teachers and students receive pen pal assignments not later than 48 hours following the entry of the last student. Students are normally matched to pen pals at a one-to-one ratio.

The Workbench uploads the pen pal's introductory letter to the teacher and generates an auto message to the teacher that the pen pal's intro letter has been posted to the teacher's mailbox. Teachers review, edit if necessary, and release the pen pal intro letter to the student's mailbox.

The student composes a combination intro/genre letter (sharing the current book with a classmate). The teacher processes and submits the letter at the end/closing of the current genre.

Students may be opted out the program at the beginning of the school year by the parent or guardian who decides to discontinue their child's participation in the program at any time before the end of the school year by requesting this action through the teacher. The teacher can also terminate a student's participation for cause. The teacher accesses his/her class roster through the Teacher Place by entering the cancellation/termination reason and deactivates the student. The Workbench systematically un-matches the student from the pen pal, generates an auto message to the student's teacher confirming the student's status change with reason and that (s)he has been unmatched from the pen pal (name), and alerts the pen pal of the student's status change with the reason and that the mentor has been placed on the waitlist for a new assignment.

A student's participation status may be terminated upon failing to submit letters for two consecutive genres. The Workbench generates an auto message that the letter due (on a specific day) is tardy five (5) days following the due date. Day fifteen after the due date (if the teacher doesn't mark the student absent) indicates the student failed to complete a letter assignment for one genre, and the Workbench marks the student absent and generates an electronic message to the student reiterating the importance of letter submission on schedule so as not to diminish their experience or the pen pal's and that participation will be terminated if (s)he fails to submit a letter for the next genre.

Should the student submit the letter within the fifteen (15) day period in which letters were deemed tardy, the Workbench generates an auto message of "THANKS" to the student for submitting the letter and reiterates the importance of completing assignments so that (s)he continues to build his/her reading, writing, and thinking skills. Should the student fail to submit a letter for a second consecutive genre, the Workbench generates an auto message to the teacher and student that the letter due (on a specific day) is tardy five (5) following this date. Day fifteen (15) after the due date (if the teacher doesn't mark the student absent) indicates the student failed to submit his/her letter for a consecutive genre—the second offense—and the Workbench generates an auto message requesting the teacher to verify the student's classroom status and whether the student's participation should be terminated due to lack of following the program's rules of conduct.

Depending on the outcome, staff may deactivate the student through the Workbench, which in turn un-matches the student from the pen pal and generate auto messages to the student's teacher and pen pal regarding the student's status change with the reason and that the pen pal has been waitlisted for a new assignment.

For the Introductory/Start-up, the Workbench generates an auto message to teachers that the pen pals' intro letters have been posted to the teachers' mailboxes. Teachers review, edit if necessary, and release the pen pal letters (individually or by batch) to the students' mailboxes. Students compose and edit response letters or drawings in the Writing Center and transmit to the teacher's inbox. Teachers review, provide feedback to the student for corrections, etc. before uploading the students' letters via the Teacher Place (individually or by batch) to the pen pals' mailboxes not later than the genre end date (approximately fourteen (14) days). The Workbench generates an auto message of "THANKS" to the teacher and student for submitting the student letters.

The Workbench generates an auto message (new mail alert) to the pen pals that the student letters have been posted to their mailbox. Students absent at the time of letter submission may still submit a letter up to fifteen (15) days after the classroom due date (before the student forfeits his chance to write) if the teacher has contacted the pen pal regarding the delay (and provided an estimated time of arrival) and has closed out the genre on schedule. If a student misses two consecutive writing assignments, the teacher must conference with the pen pal (via email) to determine if the pen pal should continue to write and/or if the student will/can continue the program.

Teachers may escalate pen pal letters with questionable content for resolution if they are unable to resolve the issue with the pen pal.

Teachers close out each genre with a letter from each student and/or include an explanation for any missing student letters. These explanations are forwarded to the appropriate pen pals.

Teachers report any difficulty uploading letters to the Workbench Help Desk through the Teacher Place, and the Workbench generates an auto message of "THANKS" for reporting the issue with a resolution estimated time of 48 hours or less.

Should the teacher fail to submit student letters fifteen (15) days after the due date or elects not to submit letters, (s)he is terminated from the program due to noncompliance. Should the teacher submit a partial classroom of letters, and/or fail to contact the affected pen pal with an explanation, and/or fail to close out the genre completely, on day fifteen (15) following the due date, the Workbench automatically marks any and/or all students missing a letter as absent, closing the genre. The Workbench generates an auto message to the teacher reiterating the importance of staying on task and meeting the terms of service so as not to diminish the experience for the students or pen pals, and that a second offense may result in his/her classroom's termination from the program.

Students are marked absent with reason at the closing of the genre by the teacher if no letter is submitted. A student marked absent has up to fifteen (15) days after the genre letter due date to complete his/her letter before this assignment is tagged as a failure to follow the program rules of conduct.

The release of pen pal letters to students by the teacher triggers the Workbench to generate and post an auto message of the Book Selection Availability for the next genre to the Teacher and Student Places. Students may choose a book title and forward it to their teacher's inbox. Teachers accept/reject and/or override the selections made by the student before saving/uploading the completed order to the Workbench through the Teacher Place.

Should a pen pal withdraw or be terminated mid-program, the program operator deactivates the pen pal, and the Workbench systematically un-matches students from the pen pal and generates an auto message to the student's teacher the pen pal's status change with the reason and that the student has been re-matched to a new pen pal and provide the name. The Workbench generates a standard closeout letter of explanation from the departing pen pal to the student and introduces the new pen pal. The Workbench generates an auto message to the new pen pal with the student's name, current book assignment, and the letter due date. The program operator sends a standard email to the former pen pal thanking them for participating in the program, etc. The program operator may report the withdrawal or termination to the corporate partner from which the volunteer pen pal came.

The student may compose and send standard email messages to his/her pen pal through the teacher through the Writing and Message Centers using prepopulated email addresses. The student may participate in discussions with his/her classmates that are monitored by the teacher through the Moderated Discussion Forums developed by the teacher. The student may compose and send standard email messages to his/her teacher through the Writing and Message Centers using prepopulated email addresses.

The teacher portion of the system is administered as follows. First, teachers log onto the program's website and complete a program application/agreement (agreeing to all terms of service) for approval along with their grade level, and email and shipping (classroom) addresses. Applications are reviewed by the program managers and are either approved or rejected. Upon completion of the review process, the teacher is notified of approval or rejection as participants.

Staff manually enters initial information for approved schools and teachers into the Workbench and initiates the classroom status (associates teacher with classroom). Teachers should display an adequate degree of knowledge of the program flow, have sufficient terms of service, and demonstrate proficiency in navigating through the Teacher Place as well as the Student Place.

A teacher commits to participate for the full school year and sign-up/attend the orientation session. Upon completion of the orientation, the Workbench generates a "Welcome" message to the teacher that includes the teacher's username and password as well as the start-up process for enrolling students, participation criteria for students, and information on privacy, COPPA, etc.

Withdrawal of a teacher from the program should be the last resort. Should the teacher need to withdraw, (s)he sends an email preferably sharing the reason for withdrawal to the Workbench Help Desk through the Teacher Place. The Workbench generates an auto message of "THANKS" for reporting the issue with a resolution estimated time of 48 hours or less. The Workbench systematically locks out teachers, un-matches students from pen pals, and generates auto messages to the students' pen pals regarding the students' status change, with a reason and an indication that they have been placed on the waitlist for a new assignment. The program operator sends a closeout letter to the teacher (with a copy to the Principal) thanking him/her for participating in the program.

Teacher participation may be terminated upon missing one genre of letter submission. Five (5) days after the due date, the Workbench generates an auto message to the teacher that letters due (enter specific date) are tardy, reiterates the importance of complying with the terms of service so as to ensure a positive rewarding experience for students and pen pals, and requests an estimated time of arrival for the student letters. The teacher contacts all pen pals with an explanation for the tardiness and includes an estimated time of arrival for the letters. The program operator generates an email of delay and includes the teacher's explanation and estimated time of arrival for the letters. Ten (10) days following the due date, the Workbench generates an auto message to the teacher that pen pals are still awaiting student letters and that termination from the program will result if letters are not submitted in the next week. Fifteen (15) days after the due date indicates the teacher failed to submit letters to close out that genre, and the program operator then sends an email message to the teacher (with a copy to the Principal) reiterating the importance of their commitment to excellence made at the beginning of the school year, that, effective immediately, participation forfeiture has commenced, and that services are terminated. The teacher is deactivated through the Workbench which in turn un-matches students from pen pals and generates auto messages to the students' pen pals regarding the students' status change and that they have been placed on the waitlist for a new assignment. Should the teacher submit letters within the fifteen (15) days of the original due date, the Workbench generates an auto message of "THANKS" to the teacher for submitting letters and reiterates the importance of submitting assignments on time so as not to diminish the experience of the students and pen pals. The teacher contacts all pen pals with an explanation for the tardiness to close out the genre so that books can be shipped to the students.

The general process of teacher involvement is described above and below with respect to the operating procedures for students and pen pals.

Teachers may compose and send standard email messages to his/her students' pen pals and to his/her students through the Writing and Message Centers using prepopulated email addresses. Teachers may develop moderated discussion (questions) forums on appropriate, grade-specific subject matter/topics for his/her classroom students. Teachers may also compose and send standard email messages to other program participating teachers through the Writing and Message Centers using prepopulated email addresses. Teachers may request program assistance from or report inappropriate use by visiting the Teacher Place and selecting "HELP."

The pen pal portion of the system is administered as follows. First, a prospective pen pal is determined and registered by logging on to a controlled website that is administered by the program operator. The pen pal, after entering their email address and creating a password at the initial screen, completes the pen pal application/agreement. After agreeing to all the program operator's terms of service, the pen pals undergo and pass a security check on the next screen. Upon completion and successful submission of the application, prospective pen pals receive an online thank you for completing an application.

An automatic message is then delivered from the Workbench indicating that the program operator is processing the application/agreement and that the program operator will contact the pen pal upon completion of the process and security check, generally in about fourteen (14) days.

If the pen pal passes the security check, the program operator sends an online "Welcome" letter through email that the security check is complete and provides information on privacy, COPPA, etc. The email also requests the pen pal to use his/her username and password (submitted when (s)he completed his/her application) to access an online site area called "Pen Pal Place."

If the pen pal doesn't pass the security check, the program operator sends an online letter to the pen pal stating (s)he failed to meet the program criteria.

After the pen pal completes the application process successfully and agrees to follow all terms of service, including notification of any changes in contact information (mailing and email addresses), (s)he is then asked to change his/her password and invited to modify his/her profile at the initial log-in. The pen pal may provide preferential information to the program operator on his/her profile to assist in determining which student is a better match.

An initial message welcomes the pen pal to the program and provides helpful hints and instructions on completing the initial introductory assignment (a letter of introduction) prior to being matched to a student. The pen pal then composes, edits, and uploads the introductory letter to the Workbench.

The program operator makes the initial match of pen pal to student on a first-come, first-serve basis from a pool of pen pals who have successfully completed the application process that includes submission of the introductory letter. In making the match, the program operator may take into account any preferences (grade, etc.) noted in the pen pal's profile.

The Workbench generates an automatic message to the pen pal introducing his/her student, the current book assignment, and the due date. The program operator uploads the pen pal's introductory letter to the assigned teacher's mailbox. During the assignment process, the program operator may reassign pen pals to the next available student when necessary, and the Workbench generates an auto message with the new match assignment (student's name) and the student's current book, writing assignment, and the corresponding deadline.

Pen pals remain active until they cancel their participation via writing or are terminated. Should the pen pal need to withdraw from the program, (s)he completes a request via the Contact Us link on the Pen Pal Place and indicates the reason for withdrawal. The Workbench generates an auto message of receipt and a "THANKS" for reporting the issue and indicating that resolution will occur within 48 hours. The program operator deactivates the pen pal, and the Workbench systematically un-matches students from the pen pal and generates auto messages to the students' teacher(s) regarding the pen pal's status change with the reason for withdrawal and indicating that they have been re-matched to a new pen pal. The Workbench generates a standard closeout letter from the pen pal to the student that introduces the new pen pal to the student according to the process described above. The Workbench generates an auto message to the new pen pal with the student's name, current book assignment, and the letter due date. The program operator sends a standard email to the former pen pal thanking them for participating in the program, etc. In addition, the program operator may generate an aggregate report on withdrawals to the corporate partners who are supplying the pen pals.

Pen pal participation may be terminated upon missing two genres of letter submissions. When the pen pal misses a letter deadline (1$^{st}$ offense), the Workbench generates an auto message that the letter due (on a specific day) is tardy and reiterates the importance of submitting assignments on time so as not to diminish the experience of the teachers and students. The Workbench may also warn that termination may result if the pen pal fails to submit a letter for another cycle. The message also inquires if the pen pal is experiencing difficulty adhering to the program timeline and asks him/her to contact the program operator if so to discuss whether or not this is the right volunteer opportunity at this time.

When a pen pal is replaced, another volunteer pen pal is asked to write to the student. The volunteer pen pal composes, edits, and uploads the letter to the teacher's mailbox. The teacher reviews, edits if necessary and releases the letter to the student.

Should the pen pal fail to submit a letter for a subsequent genre, the Workbench generates an auto message to the pen pal that this is the second offense of a tardy letter due (on a specific day), and reiterates the pen pal's commitment to excellence, the importance of meeting deadlines, and that, effective immediately, his/her services are no longer required and their program participation has been terminated.

Another volunteer pen pal is asked to write to the student. The volunteer pen pal composes, edits, and uploads the letter to the teacher's mailbox. The teacher reviews, edits if necessary, and releases the letter to the student.

The program operator deactivates the terminated pen pal through the Workbench, which in turn un-matches students from the pen pal and generates auto messages to the students' teacher(s) regarding the pen pal's status change with the reason for termination and the fact that the student has been assigned to a new pen pal. The Workbench generates a standard closeout letter from the former pen pal to the student and introduces the new pen pal and generates an auto message to the new pen pal with the student's name, current book assignment, and the letter due date. The program operator sends a standard email to the former pen pal thanking them for participating in the program.

Pen pal letters are handled as follows. First, the Workbench generates an auto message to pen pals that the student's intro letter has been posted to the pen pal's mailbox. Then the pen pal composes, reviews, edits, and uploads his/her letter to the Workbench via the Pen Pal Place not later than the scheduled due date (approximately fourteen (14) days). The Workbench generates an auto message to the teachers that the pen pals' genre letters have been posted to the teachers' mailboxes.

Teachers review, edit if necessary, and release pen pal letters via the Teacher Place (individually or by batch) to the students' mailbox. The Workbench generates an auto message (new mail from your pen pal alert) to the student.

Pen pals report any difficulty uploading letters via the Contact Us Link on the Pen Pal Place, and the Workbench generates an auto message of "THANKS" for reporting the issue with an estimated time of resolution in 48 hours or less. The Workbench help desk staff or the program operator responds with a disposition of the issue not later than 48 hours after the reporting.

The pen pal receives an email from a teacher if the student's letter is expected to be at least one day, but not later than fourteen (14) days late, or if the student is unable to write for this genre and includes the reason.

The pen pal may request to be re-matched if the student misses two writing assignments by completing a request form via the Contact Us link on the Pen Pal Place.

Pen pals may escalate student letters with questionable content to the program operator for resolution if they are unable to resolve the issue with the teacher.

When the pen pal misses a letter deadline, the Workbench generates an auto message that the letter due (on a specific day) is tardy and reiterates the importance of submitting assignments on time so as not to diminish the experience of the teachers and students. The Workbench may also indicate that participation termination may result if the student fails to submit a letter for another genre. The message also inquires if the pen pal is experiencing difficulty adhering to the program timeline and explaining that if (s)he is, (s)he should contact the help desk or the program operator to discuss. If the match is not appropriate, another volunteer pen pal is asked to write to the student.

The pen pal may compose and send standard email messages to his/her student's teacher, to the student, or to other pen pals via the Pen Pal Place Writing and Message Centers using prepopulated email addresses. Pen pals may escalate or report messages deemed inappropriate to the program operator via the Pen Pal Place by selecting the Contact Us link.

The present invention is generally directed to process-based and experiential learning in social networks. Process-based learning concepts include:

Creation of mechanisms to help learners perceive the learning process positively.

Acquisition of new knowledge in a way that extends from what learners already know.

Refinement of knowledge through analysis, review, and collaboration.

Utilization of knowledge to make decisions, perform meaningful tasks, and ask additional, meaningful questions.

Development of skills for self-directed learning and critical thinking.

Experiential learning in this context is more than "learning by doing." Learning by doing is a key element but only when combined with constructivist guidelines, whereby learning is a dynamic, guided process. In the presently-described embodiment, learners are faced with new situations or problems that they solve, with guidance as necessary.

In one embodiment, the system is a framework for providing developers of instructional systems a method for specifying the states, transitions, constraints, timing, and rules associated with process-based learning. The framework further provides developers with social networking tools to integrate collaborative activities, creation and management of learning groups, and problem-solving based interaction within the instructional system.

A fundamental precept for the invention is that students learn cumulatively, interpreting and incorporating new material with what they already know and building knowledge progressively through interaction and collaboration with others. At times, students' ability to comprehend has a tendency to level off, and their understanding can increase incoherently rather than steadily, depending on accumulation. The currently inventive framework enables progression in levels of understanding and structure that are appropriate to the stage of learning and assists learners' construct of understanding. The content advances throughout a period of study, making use of connections with other topics, previous comprehension on the same topic, and people in the learning network.

In one embodiment, the framework serves as a development platform that provides interfaces to organize management of participant communities that engage in a variety of learning processes, defined using the methods of states, constraints, transitions, rules, etc., that involve communication with other members of a social network. The framework enables definition and configuration of roles in the network and includes verification, validation, and management of safety policies. The system allows definition of roles and specification of policies and rules associated with the defined roles. Roles can then be associated with validation procedures and constraints, access levels to functionality and other members of the network, the type of content presented, and the interface that is offered for interaction.

In one embodiment, the system includes a variety of roles, including course author, course, group, institution, or network administrator. "Learners" may be students, adults, teachers, parents, or anyone who engages in a learning process within the system. Facilitators have a specific role of providing guidance, modeling, or expertise, while researchers study efficacy of different techniques, such as learning methods. A user may have more than one role. For example, a teacher may be an administrator, facilitator, and student at the same time. The framework also provides a safe learning environment because the learning management system includes social networking and may include a system of safety checks and balances.

In another embodiment, the framework for this process-based learning system also defines and manages formative assessments that are integrated into the flow of the learning process. It provides a general mechanism for specifying types of assessments, factors associated with those assessments, and management of scoring and analyses based on the assessment types and factors. The framework also provides access to data on interaction, communication, and publication between participants in a collaborative network to assess learning activities.

In yet another embodiment, the framework provides an interface to plug-in tools, applets, and/or applications that support specific learning processes, which may, for example, include an interactive science project or a group collaboration on developing alternative plots or endings to a narrative. In one embodiment, the framework provides application programmer interfaces to the framework to manage user state, configuration, role, etc., as they interact with the applications and overall learning system.

The system also provides typical information management services to obtain and store information related to users, courses, history, assignments, assessment, payment, and other general areas related to a system's users. The system manages an iterative or step-wise learning process in order to dynamically adapt based on each learner's role, usage characteristics, profile, and assessment.

In one embodiment, the framework provides the ability to specify definitions regarding an engaging learning activity that conveys to participants a positive attitude about learning, especially in the initialization and registration procedures. These processes simultaneously glean data that can be subsequently used by other processes in the learning flow in such a manner to help the system adapt the level of the tools, content, place in process, etc. that are appropriate to the participant's zone of proximal development. This data includes items such as each participant's start state and set of attributes. The information gathered is also part of the start state for the overall system.

As a participant progresses through a sequence of communications, the system assesses the progression and delivers constructive feedback, as opposed to formal grades of traditional systems. This assessment enables opportunities for discovery and integration of content and knowledge, and allows other participants to expand their own knowledge about the current topic, while broadening knowledge about related topics.

The system uses multidimensional data structures to enable this horizontal and vertical integration, thereby providing hooks into references and content management in ways that are important to the process flow involving the particular participants. Classification of material is related to attributes that are tied to the learning process, and a participant's exploration of content is tracked to drive the learning process. The system learns about each participant, thereby enabling it to identify content and other participants of relevance in an improved manner.

The classification schemes enable this process-based content management system to retrieve and mark content derived from factors that are based on knowledge and on attributes relative to the learning process. The system traverses through the content concentration, which allows creation of both vertical and horizontal segments through the multidimensional data structure linked to a participant's topic of study. Similarly, the same attributes are used to dynamically customize the presentation, interface, and tools used to guide the participant through that content. The participant's self-directed discovery leads to connections with others in the social network who have examined the content in a similar way or who have arrived at a similar set of retrievals.

In one embodiment, the framework is a finite-state machine and a set of workflow processes, consisting of a set of states, transitions between the states, and criteria to determine when a participant or object exits a state. These include both specific actions and the passage of time in the absence of an expected action. Messages to the learning community or to the users are based on transitions between states, which can combine single states or two or more into one (a joint transition), or can fork to a choice of states. The framework provides an interface for defining these transitions and for communicating events dynamically to specific members of the network.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for clustering multiple nodes in a social network wherein at least one of the multiple nodes will be unclustered and at least two of the multiple nodes will be clustered, the method comprising the steps of:

- defining a structured network environment having multiple nodes;
- identifying relative positions for the multiple nodes within the structured network environment, wherein each of the multiple nodes to be clustered has at least one associated attribute that is capable of being validated by the unclustered node, wherein the unclustered node does not have administrative control over all the multiple nodes in the structured network environment and wherein the relative positions are identified based on a comparison of attributes associated with each of the multiple nodes;
- clustering of the multiple nodes based on the identified relative positions of the multiple nodes to be clustered and allowing at least some of the multiple clustered nodes to discover others of the clustered multiple nodes;
- synchronizing an activity among the nodes to be participated in by the clustered multiple nodes based on the relative positions, wherein the identification of the relative positions of the clustered nodes and the synchronization of the clustered nodes are performed without reference to actual time; and
- serving content or information to the clustered multiple nodes based on the positions and wherein such content or information is served to the clustered multiple nodes after clustering thereof without the node subscribing to such content or information and wherein such content or information is not from received from another node.

2. The method of claim 1, wherein the content comprises multimedia.

3. The method of claim 1 further comprising the step of coordinating activities for one or more of the multiple nodes.

4. The method of claim 3, wherein the activities comprise playing of games.

5. The method of claim 3, wherein the activities comprise participation in polls.

6. The method of claim 3, wherein the activities comprise participation in contests.

7. The method of claim 3, wherein the activities comprise receipt of information feeds.

8. The method of claim 1, wherein the clustering, synchronizing, or serving is managed according to defined roles or rules associated with the defined roles or rules.

9. The method of claim 8, wherein the defined roles or rules are associated with one or more of the following: validation procedures and constraints, access levels to functionality and other nodes of the network, the type of content served, and the interface that is offered for any activity coordinated.

10. The method of claim 1, wherein the step of clustering results in a plurality of clusters of the multiple nodes, the method further comprising graphically displaying the clusters.

11. The method of claim 1 further comprising the step of resynchronizing the activity of the multiple nodes to allow for changes in the relative positions of the nodes and then serving content or information to the multiple nodes of the cluster based on the resynchronization.

12. The method of claim 1 wherein the activity uses information generated by one of the nodes in the cluster of multiple nodes.

13. A method for clustering multiple nodes in a social network, the method comprising the steps of:

- defining a structured network environment having multiple nodes;
- identifying relative positions for the multiple nodes within the structured network environment, wherein each of the multiple nodes has at least one associated attribute that is capable of being validated by a node not within a cluster of nodes;
- identifying relative positions for the multiple nodes within the structured network environment, wherein each of the multiple nodes to be clustered has at least one associated attribute that is capable of being validated by the unclustered node, wherein the node not within the cluster of nodes does not have administrative control over all the multiple nodes in the structured network environment and wherein the relative positions are identified based on a comparison of attributes associated with each of the multiple nodes;
- clustering the multiple nodes based on the at least one associated validatable attribute;
- synchronizing an activity among the nodes to be participated in by the clustered multiple nodes based on the relative positions of the clustered multiple nodes, wherein the identification of the relative positions and the synchronization of the clustered nodes are performed without reference to actual time; and
- serving content or information to the multiple nodes of the cluster based on the relative positions and wherein such content or information is served to the clustered multiple nodes after clustering thereof without the node subscribing to such content or information and wherein such content or information is not from received from another node; and
- wherein the identifying, clustering, synchronizing, or serving is managed according to defined roles or rules associated with the defined roles or rules.

14. The method of claim 13, wherein the cluster of multiple nodes comprises multiple clusters of multiple nodes.

15. The method of claim 13 further comprising the step of resynchronizing the activity of the multiple nodes to allow for changes in the relative positions of the nodes and then serving content or information to the multiple nodes of the cluster based on the resynchronization.

16. The method of claim 13 wherein the activity uses information generated by one of the nodes in the cluster of multiple nodes.

* * * * *